(12) United States Patent
Hagiwara

(10) Patent No.: US 7,912,222 B2
(45) Date of Patent: Mar. 22, 2011

(54) CONNECTION AUTHENTICATION IN WIRELESS COMMUNICATION NETWORK SYSTEM

(75) Inventor: Toyotaka Hagiwara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1403 days.

(21) Appl. No.: 11/108,909

(22) Filed: Apr. 19, 2005

(65) Prior Publication Data

US 2005/0276418 A1     Dec. 15, 2005

(30) Foreign Application Priority Data

Apr. 22, 2004 (JP) .................. 2004-126213
Jul. 8, 2004 (JP) .................. 2004-201661

(51) Int. Cl.
*H04K 1/00* (2006.01)

(52) U.S. Cl. ........ 380/270; 713/156; 713/168; 713/169; 713/171; 380/30; 380/247

(58) Field of Classification Search .................. 713/156, 713/168, 171, 169; 380/30, 247, 270
See application file for complete search history.

(56) References Cited

U.S. PATENT DOCUMENTS

| | | | | | |
|---|---|---|---|---|---|
| 4,159,448 | A | * | 6/1979 | Parham | 370/212 |
| 5,237,612 | A | * | 8/1993 | Raith | 380/247 |
| 5,398,285 | A | * | 3/1995 | Borgelt et al. | 380/30 |
| 6,377,589 | B1 | * | 4/2002 | Knight et al. | 370/524 |
| 6,965,585 | B2 | * | 11/2005 | Grilli et al. | 370/331 |
| 7,020,456 | B2 | * | 3/2006 | Smeets et al. | 455/411 |
| 7,123,721 | B2 | * | 10/2006 | Panjwani et al. | 380/270 |
| 7,216,231 | B2 | * | 5/2007 | Gehrmann | 713/171 |
| 7,324,644 | B2 | * | 1/2008 | Saito | 380/200 |
| 2002/0066018 | A1 | * | 5/2002 | Linnartz | 713/171 |
| 2004/0015693 | A1 | * | 1/2004 | Kitazumi | 713/171 |

FOREIGN PATENT DOCUMENTS

| | | |
|---|---|---|
| JP | 2001-156723 A | 6/2001 |
| JP | 2001-285956 A | 10/2001 |
| JP | 2002-073565 A | 3/2002 |

* cited by examiner

*Primary Examiner* — Edan Orgad
*Assistant Examiner* — Kari L Schmidt
(74) *Attorney, Agent, or Firm* — Sughrue Mion, PLLC

(57) ABSTRACT

In response to reception of a first piece of security code generating information from a wireless terminal by directional wireless communication, a wireless station sends wireless station ID information and a second piece of security code generating information to the wireless terminal by the directional wireless communication. The wireless station encrypts one of the first and the second pieces of security code generating information with the other of the first and the second pieces of security code generating information as an encryption key to generate a security code. The wireless terminal receives both the wireless station ID information and the second piece of security code generating information sent by directional wireless communication, and encrypts one of the first and the second pieces of security code generating information with the other of the first and the second pieces of security code generating information as the encryption key to generate the security code.

This arrangement of the invention enables the user to explicitly specify a desired access point as a connection target and ensures easy and high-security connection authentication between the user's wireless terminal and the access point.

12 Claims, 11 Drawing Sheets

Fig.6

Response Data Pif(128bits)

| LAP (24bits) | Undefined (2bits) | SR (2bits) | SP (2bits) | UAP (8bits) | NAP (16bits) | Class of Device (24bits) | CLK$_{27-2}$ (26bits) | Page scan mode (3bits) | all zero (21bits) |
|---|---|---|---|---|---|---|---|---|---|

(LSB) → (MSB)

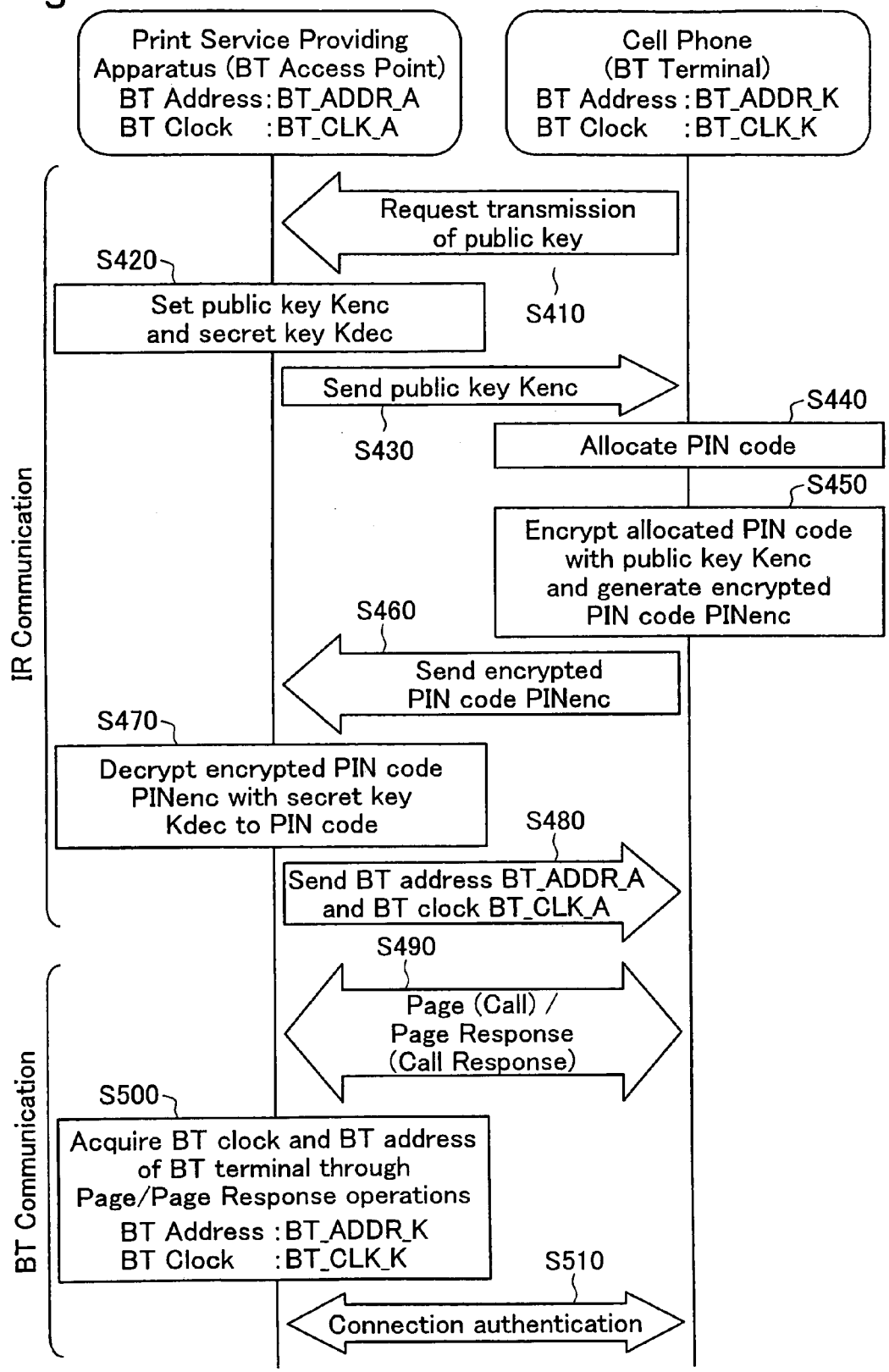

CONNECTION AUTHENTICATION IN WIRELESS COMMUNICATION NETWORK SYSTEM

BACKGROUND OF THE INVENTION

1. Field of the Invention

The present invention relates to a technique of connection authentication performed to allow wireless communication between a wireless terminal having control functions as a wireless station (hereafter may be referred to as 'access point') and a wireless terminal under control of the wireless station (hereafter may simply be referred to as 'terminal') in a wireless communication network that adopts a short-range wireless communication standard, such as Bluetooth, for data transfer.

2. Description of the Related Art

Diversity of electronic devices (wireless terminals) having wireless communication functions (BT functions) in conformity with the Bluetooth (BT) standard, for example, cell phones and digital cameras (BT terminals) have been under development. It is expected to spread various services involved in such BT terminals. One example of such services prints photos taken by cell phones and digital cameras (images expressed by electronic data) (hereafter referred to as 'photo print service').

In one typical system of the photo print service, a print service providing apparatus (BT access point) is installed in some place filled with many people, for example, a family restaurant, a tourist attraction, an amusement part, or a railway station (hereafter referred to as 'public space'). The user of the photo print service transfers electronic data of object photos to be printed by wireless communication of the BT standard (BT communication) from the user's BT terminal, for example, cell phone or digital camera, to the print service providing apparatus as the BT access point. The print service providing apparatus then prints images (photos) expressed by the transferred electronic data.

The BT communication between the BT access point and the BT terminal is made by exchanging ID information (BT addresses) required for established connection of a BT communication link between the BT access point and the BT terminal. The typical procedure of connecting the BT terminal to the BT access point sets an 'inquiry' mode of the BT standard, sends an inquiry to a BT access point located in the coverage of radio waves from the BT terminal, and exchanges the ID information required for connection of the BT communication link with a responding BT access point. Connection of the BT communication link is established between the BT terminal and the BT access point, based on the exchanged ID information.

In the inquiry mode, however, the BT access point equally responds to all the BT terminals that have sent the inquiries to make connection of the BT communication link. Some of the BT terminals within the coverage of radio waves from the BT access point may be possessed by unauthorized or illegal users or by careless users who do not intend to currently receive the service but have mistakenly given the inquiries. The BT access point readily makes connection of the BT communication link with such unauthorized, illegal, and careless users. Especially at the BT access point installed in a public space filled with general public, there is a high potential that such unauthorized, illegal and careless users interfere with the smooth service to the authorized users. In the description below, the connection interfering with smooth service is called 'improper connection'.

The BT terminal exchanges the ID information required for connection of the BT communication link with the BT access point responding to the inquiry and establishes connection of the BT communication link with the responding BT access point. There is accordingly a possibility that the BT terminal exchanges the required ID information even with a fake BT access point disguised as a legal BT access point and makes connection of the BT communication link with the fake BT access point. Important personal information may thus be stolen from the BT terminal establishing connection with the fake BT access point.

In the service system based on BT communication, it is thus essential to prevent improper connections and allow only the user who actually desires the service to specify a BT access point as a connection target. It is also preferable to enable the user to confirm the connecting BT access point as a legal BT access point providing the desired service. The requirements are thus to enable the user to explicitly specify a desired BT access point as a connection target and to ensure established connection of a communication link between the specified BT access point and the user's BT terminal.

One proposed technique to solve the above problem utilizes infrared (IR) communication to send the ID information required for connection of the BT communication link from the BT terminal to the BT access point as disclosed in Japanese Patent Laid-Open Gazette No. 2001-156723. Infrared radiation has high directivity and short coverage of only several meters. The user should thus sufficiently approach to and visually confirm a desired BT access point as a connection target of the user's BT terminal. The user then sends the ID information required for connection of the BT communication link from the user's BT terminal to the desired BT access point by IR communication. This proposed technique enables the user to explicitly specify a desired BT access point as the connection target and establishes connection of the BT communication link between the specified BT access point and the user's BT terminal.

The primary issue of wireless communication is leakage and interception of transmitted information. Cryptography of transmitted information is thus the general procedure to protect the security. The BT standard specifies cryptography of information and enables encryption of information prior to transmission. The general procedure of encrypting the transmitted information in BT communication receives individual entries of an identical PIN (Personal Identification Number) code in the BT terminal and in the BT access point and performs connection authentication between the BT terminal and the BT access point.

The disclosure of the above cited reference only regards the technique relating to establishment of connection of the BT communication link but does not take into account connection authentication.

One typical method of entry of a PIN code in the BT terminal requires the user to read the PIN code provided through a display on the BT access point and to enter the PIN code in the user's BT terminal. This method, however, forces the relatively troublesome entry operations of the PIN code on the user. There are also other potential problems: the user may enter a wrong PIN code; and any unauthorized third person may steal a glance at the displayed PIN code. The third person may enter the stolen PIN code in his own BT terminal to illegally have connection authentication and acquire information.

The PIN code provided by the BT access point may be sent to the BT terminal by IR communication or BT communication to ensure the use of the identical PIN code by the BT access point and the BT terminal. This proposed method makes the user free from the troublesome entry operations of the PIN code. Both the IR communication and the BT communication are wireless and may thus disadvantageously allow the PIN code to be readily intercepted and captured by any unauthorized third person.

The above drawbacks are not restricted to the wireless communication network system including the BT terminal connected to the BT access point, but are also found in diversity of wireless communication network systems that use various wireless communication standards other than BT for data transfer.

SUMMARY OF THE INVENTION

The object of the invention is thus to eliminate the drawbacks of the prior art and to provide a technique applied in a wireless communication network system including a wireless terminal connected to an access point of wireless communication (wireless station). The technique aims to enable the user to explicitly specify a desired access point as a connection target and accordingly make connection of a communication link between the specified access point and the user's wireless terminal. The technique also aims to ensure easy and high-security connection authentication between the wireless thermal and the access point.

In order to attain at least part of the above and the other related objects, the present invention is directed to a first wireless communication network system including a wireless station and at least one wireless terminal connected to the wireless station via a specific wireless communication link.

The wireless station includes: a first directional wireless communication module that establishes directional wireless communication utilizing a directional communication medium with the wireless terminal; a first wireless communication module that establishes specified wireless communication via the specific wireless communication link with the wireless terminal; and a first authentication control module that controls the first directional wireless communication module and the first wireless communication module and performs connection authentication of the specific wireless communication link with the wireless terminal.

The wireless terminal includes: a second directional wireless communication module that establishes the directional wireless communication with the wireless station; a second wireless communication module that establishes the specified wireless communication with the wireless station; and a second authentication control module that controls the second directional wireless communication module and the second wireless communication module and performs connection authentication of the specific wireless communication link with the wireless station.

When the first directional wireless communication module of the wireless station receives a first piece of security code generating information for generation of a security code, which is used for connection authentication of the specific wireless communication link, from the second directional wireless communication module of the wireless terminal, the first authentication control module causes wireless station ID information used for connection of the specific wireless communication link and a second piece of security code generating information for generation of the security code to be sent from the first directional wireless communication module to the second directional wireless communication module.

The first authentication control module encrypts one of the first and the second pieces of security code generating information with the other of the first and the second pieces of security code generating information as an encryption key and thereby generates the security code.

When the second directional wireless communication module of the wireless terminal receives both the wireless station ID information and the second piece of security code generating information, which are sent from the first directional wireless communication module of the wireless station, after transmission of the first piece of security code generating information from the second directional wireless communication module of the wireless terminal to the first directional wireless communication module of the wireless station, the second authentication control module encrypts one of the first and the second pieces of security code generating information with the other of the first and the second pieces of security code generating information as the encryption key and thereby generates the security code.

In the first wireless communication network system of the invention, only after transmission of the first piece of security code generating information from the wireless terminal to the wireless station by directional wireless communication, the wireless terminal acquires the wireless station ID information used for connection of the specific wireless communication link through the directional wireless communication between the wireless terminal and the wireless station. The directional wireless communication generally has high directivity and short coverage of signals. The user should accordingly be located in the coverage of signals to make directional wireless communication between the user's wireless terminal and the wireless station. The user generally approaches to the wireless station at a visually recognizable position. The user can thus explicitly specify a desired wireless station as a connection target of the user's wireless terminal.

The wireless station and the wireless terminal independently encrypt one of the first and the second pieces of security code generating information with the other of the first and the second pieces of security code generating information as the encryption key and thereby generate the security code. Here the first piece of security code generating information is sent from the wireless terminal to the wireless station by directional wireless communication, while the second piece of security code generating information is sent from the wireless station to the wireless terminal by directional wireless communication. This arrangement ensures the easy and high-security connection authentication between the wireless station and the wireless terminal.

In one preferable structure, the second authentication control module computes an exclusive OR of the first piece of security code generating information and preset mask information to generate an encrypted first piece of security code generating information and controls the second directional wireless communication module of the wireless terminal to send the encrypted first piece of security code generating information to the first directional wireless communication module of the wireless station.

This arrangement ensures relatively high-security transmission of the first piece of security code generating information from the wireless terminal to the wireless station.

It is preferable that the preset mask information is generated by encrypting at least data generated according to wireless terminal ID information used for connection of the specific wireless communication link.

This arrangement advantageously enhances the confidentiality of the first piece of security code generating information.

In the preferable structure, the first authentication control module computes an exclusive OR of the second piece of security code generating information and the encrypted first piece of security code generating information to generate an encrypted second piece of security code generating information and controls the first directional wireless communication module of the wireless station to send the encrypted second piece of security code generating information to the second directional wireless communication module of the wireless terminal.

This arrangement ensures relatively high-security transmission of the second piece of security code generating information from the wireless station to the wireless terminal.

In one preferable embodiment of the wireless communication network system of the invention, the first wireless communication module has multiple wireless communication units having different pieces of the wireless station ID information.

When the first directional wireless communication module of the wireless station receives the first piece of security code generating information, the first authentication control module selects one wireless communication unit among the multiple wireless communication units based on a preset first condition, as the first wireless communication module.

This arrangement enables adequate selection of one of the multiple wireless communication units according to the preset first condition as the first wireless communication module. For example, the preset first condition may select a wireless communication unit having the least communication load among the multiple wireless communication units. This arrangement substantially equalizes the communication loads of the respective wireless communication units. The preset first condition may alternatively select one of the remaining wireless communication units other than the wireless communication unit selected last time. This arrangement prevents consecutive selection of any identical wireless communication unit, thus enhancing the security of wireless communication. The preset first condition may be a combination of the above conditions that selects a wireless communication unit having the least communication load among the remaining wireless communication units other than the wireless communication unit selected last time. This arrangement effectively enhances the security of wireless communication, while substantially equalizing the communication loads of the respective wireless communication units.

In another preferable embodiment of the wireless communication network system of the invention, the first wireless communication module has multiple wireless communication units.

When the first directional wireless communication module of the wireless station receives the first piece of security code generating information, the first authentication control module selects one wireless communication unit among the multiple wireless communication units based on a preset first condition, as the first wireless communication module.

The first authentication control module selects one piece of the wireless station ID information among multiple pieces of the wireless station ID information provided in advance as possible options based on a preset second condition, and sets the selected piece of the wireless station ID information in the wireless communication unit selected as the first wireless communication module.

This arrangement enables adequate selection of the wireless station ID information according to the preset second condition among the multiple pieces of the wireless station ID information to be set in the wireless communication unit selected as the first wireless communication module. For example, the preset second condition may select a piece of the wireless station ID information that has not been used for a longest time period. This arrangement desirably prevents consecutive selection of any identical piece of the wireless station ID information, thus enhancing the security of wireless communication.

In still another preferable embodiment of the wireless communication network system of the invention, when the first directional wireless communication module of the wireless station receives the first piece of security code generating information, the first authentication control module selects one piece of the wireless station ID information among multiple pieces of the wireless station ID information provided in advance as possible options based on a preset condition, and sets the selected piece of the wireless station ID information in the first wireless communication module.

This arrangement enables adequate selection of the wireless station ID information according to the preset second condition among the multiple pieces of the wireless station ID information to be set in the first wireless communication module. For example, the preset second condition may select a piece of the wireless station ID information that has not been used for a longest time period. This arrangement desirably prevents consecutive selection of any identical piece of the wireless station ID information, thus enhancing the security of wireless communication.

In another preferable embodiment of the wireless communication network system of the invention, the first directional wireless communication module has multiple directional wireless communication units to make the directional wireless communication with multiple wireless terminals.

This arrangement enables distributed locations of multiple directional wireless communication units.

The present invention is also directed to a second wireless communication network system including a wireless station and at least one wireless terminal connected to the wireless station via a specific wireless communication link.

The wireless station includes: a first directional wireless communication module that establishes directional wireless communication utilizing a directional communication medium with the wireless terminal; a first wireless communication module that establishes specified wireless communication via the specific wireless communication link with the wireless terminal; and a first authentication control module that controls the first directional wireless communication module and the first wireless communication module and performs connection authentication of the specific wireless communication link with the wireless terminal.

The wireless terminal includes: a second directional wireless communication module that establishes the directional wireless communication with the wireless station; a second wireless communication module that establishes the specified wireless communication with the wireless station; and a second authentication control module that controls the second directional wireless communication module and the second wireless communication module and performs connection authentication of the specific wireless communication link with the wireless station.

When the first directional wireless communication module of the wireless station receives information representing an encryption key for encrypting a security code, which is used for connection authentication of the specific wireless communication link, from the second directional wireless communication module of the wireless terminal, the first authentication control module causes encrypted security code information representing the security code encrypted with the encryption key and wireless station ID information used for connection of the specific wireless communication link to be sent from the first directional wireless communication module to the second directional wireless communication module.

When the second directional wireless communication module of the wireless terminal receives the encrypted security code information sent from the first directional wireless communication module of the wireless station after transmission of the information representing the encryption key from the second directional wireless communication module of the wireless terminal to the first directional wireless communication module of the wireless station, the second authentication control module decrypts the encrypted security code represented by the encrypted security code information with a decryption key correlated to the encryption key and controls the second directional wireless communication module of the wireless terminal to receive the wireless station ID information sent from the first directional wireless communication module.

Like the first wireless communication network system described above, the second wireless communication network system of the invention enables the user to explicitly specify a desired wireless station as a connection target of the user's wireless terminal and ensures easy and high-security connection authentication between the wireless station and the user's wireless terminal.

The present invention is further directed to a third wireless communication network system including a wireless station and at least one wireless terminal connected to the wireless station via a specific wireless communication link.

The wireless station includes: a first directional wireless communication module that establishes directional wireless communication utilizing a directional communication medium with the wireless terminal; a first wireless communication module that establishes specified wireless communication via the specific wireless communication link with the wireless terminal; and a first authentication control module that controls the first directional wireless communication module and the first wireless communication module and performs connection authentication of the specific wireless communication link with the wireless terminal.

The wireless terminal includes: a second directional wireless communication module that establishes the directional wireless communication with the wireless station; a second wireless communication module that establishes the specified wireless communication with the wireless station; and a second authentication control module that controls the second directional wireless communication module and the second wireless communication module and performs connection authentication of the specific wireless communication link with the wireless station.

When the first directional wireless communication module of the wireless station receives a transmission request that requires transmission of an encryption key for encrypting a security code, which is used for connection authentication of the specific wireless communication link, from the second directional wireless communication module of the wireless terminal, the first authentication control module causes encryption key information representing the encryption key to be sent from the first directional wireless communication module to the second directional wireless communication module.

When the second directional wireless communication module of the wireless terminal receives the encryption key information sent from the first directional wireless communication module of the wireless station after transmission of the transmission request from the second directional wireless communication module of the wireless terminal to the first directional wireless communication module of the wireless station, the second authentication control module causes encrypted security code information representing the security code encrypted with the encryption key to be sent from the second directional wireless communication module to the first directional wireless communication module.

When the first directional wireless communication module of the wireless station further receives the encrypted security code information sent from the second directional wireless communication module of the wireless terminal, the first authentication control module decrypts the encrypted security code represented by the encrypted security code information with a decryption key correlated to the encryption key and causes wireless station ID information used for connection of the specific wireless communication link to be sent from the first directional wireless communication module to the second directional wireless communication module.

Like the first wireless communication network system described above, the third wireless communication network system of the invention enables the user to explicitly specify a desired wireless station as a connection target of the user's wireless terminal and ensures easy and high-security connection authentication between the wireless station and the user's wireless terminal.

The technique of the invention is actualized by diversity of applications, for example, a wireless communication network, a wireless station included in the wireless communication network, a wireless terminal connected to the wireless station, a connection authentication method, computer programs that attain such network, station, terminal, and method, and recording media in which such computer programs are recorded. Any of the above arrangements and structures may be adopted in these applications.

Typical examples of the computer readable recording media include flexible disks, CD-ROMs, DVD-ROMs, magneto optical disks, IC cards, and hard disks.

BRIEF DESCRIPTION OF THE DRAWINGS

FIG. 6 shows the structure of response data Pif;

FIG. 12 shows a procedure of connection authentication performed between the print service providing apparatus PSV and the cell phone PT in a sixth embodiment.

DESCRIPTION OF THE PREFERRED EMBODIMENTS

Some modes of carrying out the invention are described below as preferred embodiments in the following sequence:
A. First Embodiment
  A.1. Configuration of Print Service Providing System
  A.2. Connection Authentication Process
  A.3. Effects
B. Second Embodiment
C. Third Embodiment
D. Fourth Embodiment
E. Fifth Embodiment
F. Sixth Embodiment
G. Modifications

A. First Embodiment

A.1. Configuration of Print Service Providing System

Figure 1:
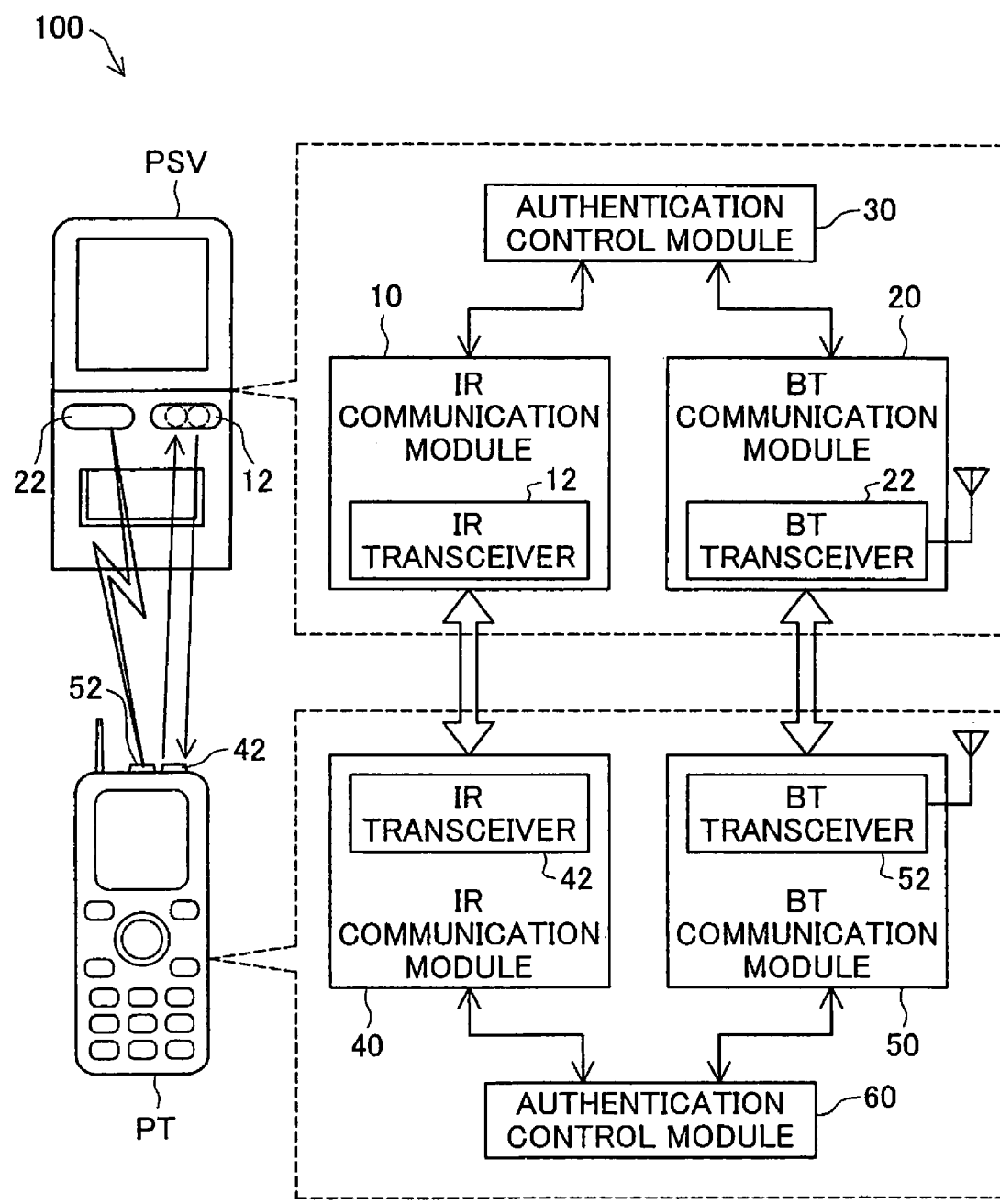
FIG. 1 schematically illustrates the configuration of a print service providing system as a first embodiment of the communication network system of the invention.

FIG. 1 schematically illustrates the configuration of a print service providing system as a first embodiment of the communication network system of the invention. The print service providing system 100 includes a print service providing apparatus PSV that provides print services and a cell phone PT that is connected to the print service providing apparatus PSV by BT communication link. The user establishes connection between the user's cell phone PT and the print service providing apparatus PSV by IR communication link and BT communication link according to a procedure described below. The user sends electronic data of an object photo (image) to be printed from the cell phone PT to the print service providing apparatus PSV by BT communication link. The print service providing apparatus PSV prints the object image according to the received electronic data.

The print service providing apparatus PSV includes an IR communication module 10, a BT communication module 20, and an authentication control module 30 as the wireless communication functional modules of the invention, and functions as a BT access point (wireless station). The cell phone PT similarly includes an IR communication module 40, a BT communication module 50, and an authentication control module 60 as the wireless communication functional modules of the invention, and functions as a BT terminal (wireless terminal). The print service providing apparatus PSV is a computer and has internal memory units, external storage units, wire communication units, diversity of other peripheral equipment, various interfaces including a display interface and an input interface, and various controllers, which are conventionally incorporated in general computers. The elements that are not related to the characteristics of the invention are neither illustrated nor described here. The cell phone PT also has various elements conventionally incorporated in general cell phones. The elements that are not related to the characteristics of the invention are neither illustrated nor described here.

The print service providing apparatus PSV as the BT access point is capable of making simultaneous connections with a maximum of seven BT terminals (wireless terminals) by the BT communication link according to the BT standard. For the clarity of explanation, in the configuration of the first embodiment, only one cell phone PT as the BT terminal is connected to the print service providing apparatus PSV as the BT access point.

The IR communication module 10 of the print service providing apparatus PSV and the IR communication module 40 of the cell phone PT make infrared communication (IR communication) according to, for example, the IrDA (Infrared Data Association) standard.

The BT communication module 20 of the print service providing apparatus PSV and the BT communication module 50 of the cell phone PT make wireless communication (BT communication) according to the BT terminal.

The authentication control module 30 of the print service providing apparatus PSV controls the operations of the IR communication module 10 and the BT communication module 20 of the print service providing apparatus PSV. The authentication control module 60 of the cell phone PT controls the operations of the IR communication module 40 and the BT communication module 50 of the cell phone PT.

In the print service providing system 100 of the embodiment, the cooperative controls of the authentication control module 30 of the print service providing apparatus PSV and the authentication control module 60 of the cell phone PT implement connection authentication between the print service providing apparatus PSV as the BT access point and the cell phone PT as the BT terminal, as described below.

A.2. Connection Authentication Process

Figure 2:
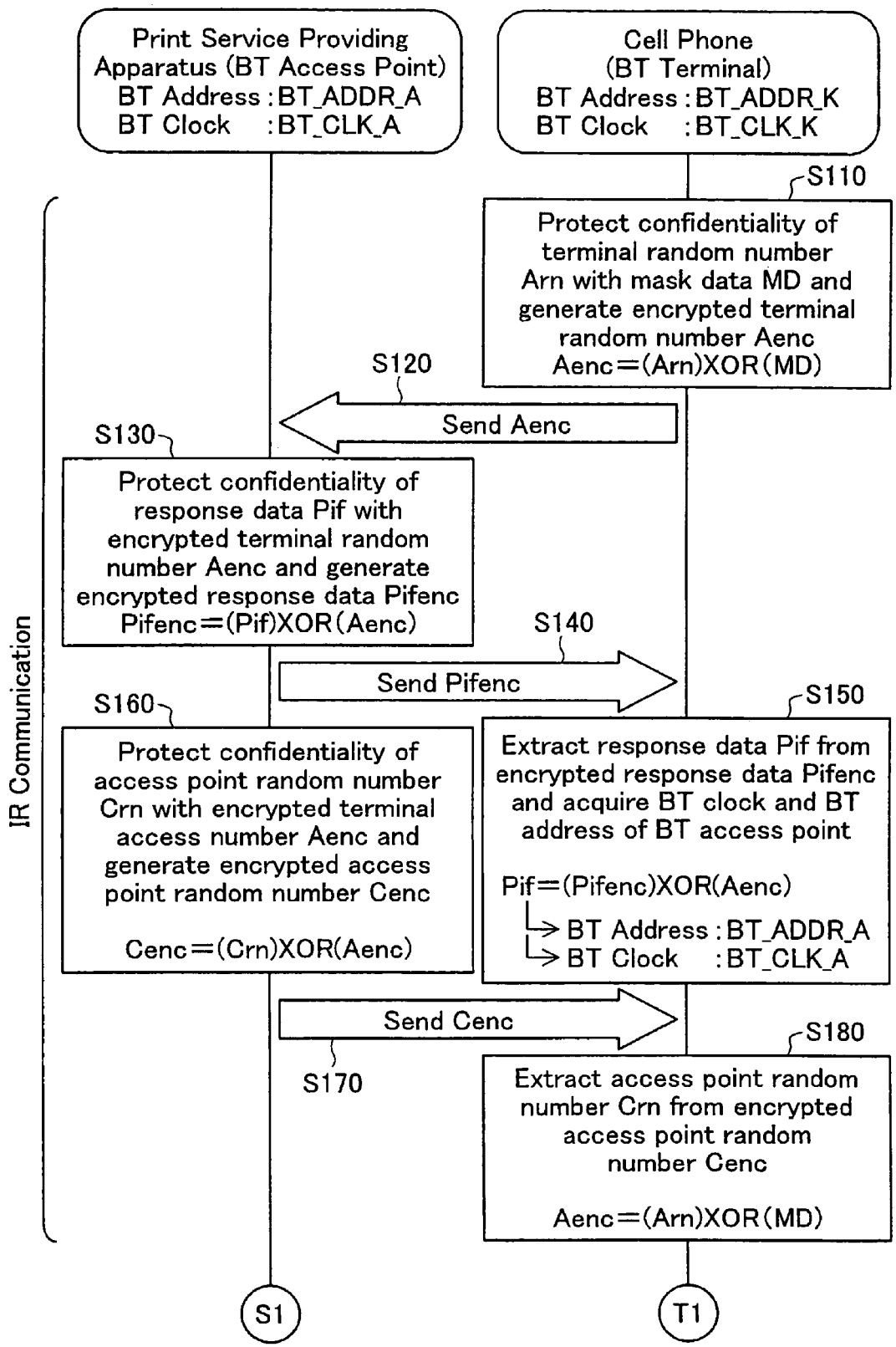
FIG. 2 shows a procedure of connection authentication performed between a print service providing apparatus PSV and a cell phone PT.
Figure 3:
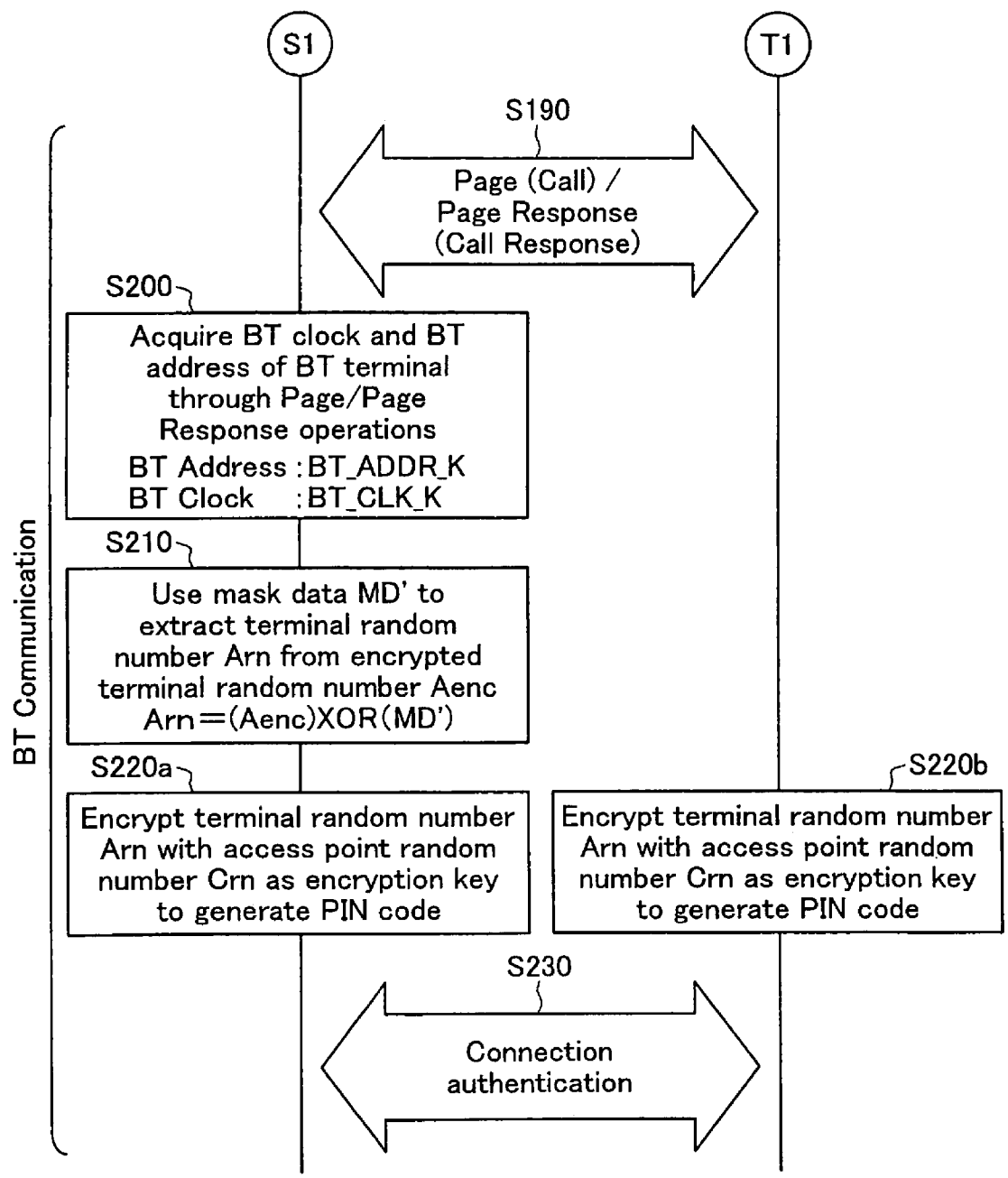
FIG. 3 shows the procedure of connection authentication performed between the print service providing apparatus PSV and the cell phone PT.

FIGS. 2 and 3 show the procedure of connection authentication performed between the print service providing apparatus PSV and the cell phone PT.

The user of the cell phone PT directs an IR transceiver 42 (see FIG. 1) included in the IR communication module 40 of the cell phone PT toward an IR transceiver 12 (see FIG. 1) included in the IR communication module 10 of the print service providing apparatus PSV and operates a connection authentication start button (not shown) to start IR communication according to the procedure of FIG. 2. BT communication is then made according to the procedure of FIG. 3 to perform connection authentication of the BT communication link via a BT transceiver 52 (see FIG. 1) included in the BT communication module 50 of the cell phone PT and a BT transceiver 22 (see FIG. 1) included in the BT communication module 20 of the print service providing apparatus PSV.

The authentication control module 60 of the cell phone PT (hereafter may be referred to as the terminal authentication control module 60) generates a 16-byte (128-bit) terminal random number Arn and computes an exclusive OR (XOR) of the terminal random number Arn and 16-byte mask data MD (described later) according to Equation (1) given below to protect the confidentiality of the terminal random number Arn and generate an encrypted terminal random number Aenc (step S110):

$$Aenc = (Arn) XOR (MD) \qquad (1)$$

The encrypted terminal random number Aenc is sent to the IR communication module 10 of the print service providing apparatus PSV (hereafter may be referred to as the access point IR communication module 10) via the IR communication module 40 of the cell phone PT (hereafter may be referred to as the terminal IR communication module 40) (step S120).

Figure 4A:
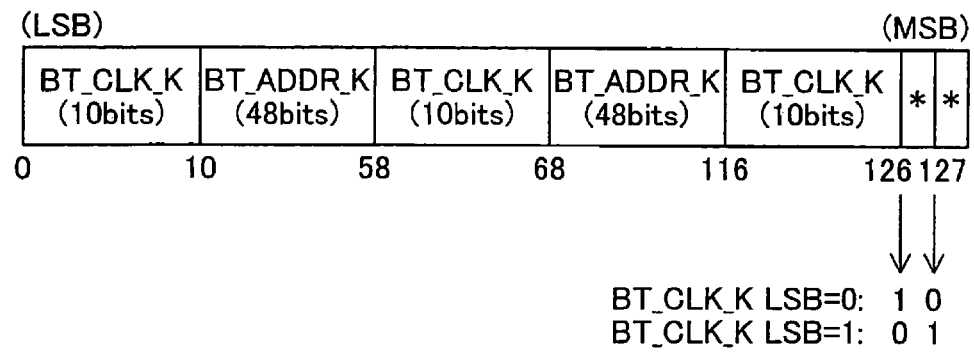
FIGS. 4(a) and 4(b) show a process of generating mask data MD.
Figure 4B:
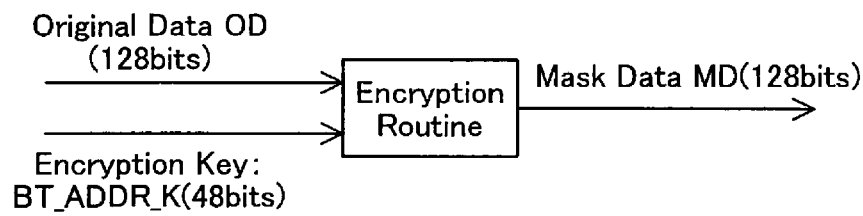

The mask data MD is generated as discussed below. FIG. 4 shows a process of generating the mask data MD. FIG. 4(a) shows one example of original data OD used for generation of the mask data MD, and FIG. 4(b) shows generation of the mask data MD from the original data OD.

The terminal random number Arn is an important piece of data for generation of a PIN code as described later and is thus required to have high confidentiality. The exclusive OR (XOR) of this terminal random number Arn and the mask data MD according to Equation (1) given above generates the encrypted terminal random number Aenc having the improved confidentiality.

The print service providing apparatus PSV is required to generate mask data identical with the mask data MD used for generation of the encrypted terminal random number Aenc, in order to extract the original terminal random number Arn from the encrypted terminal random number Aenc.

In the example of FIG. 4(a), the original data OD used for generation of the mask data MD includes alternate repetitions of 10 bits out of a 28-bit BT clock BT_CLK_K and of a 48-bit BT address BT_ADDR_K of the cell phone PT. The original data OD is 128-bit (16-byte) data of the $0^{th}$ bit (LSB) to the $127^{th}$ bit (MSB). The upper-most 2 bits, the $126^{th}$ bit and the $127^{th}$ bit, of the original data OD are set corresponding to the value of the lower-most bit (LSB) of the 28-bit BT clock BT_CLK_K. The $126^{th}$ bit and the $127^{th}$ bit are respectively set to '1' and '0' for the LSB value of '0'. The $126^{th}$ bit and the $127^{th}$ bit are respectively set to '0' and '1' for the LSB value of '1'. These upper-most 2 bits may be both set to an identical value '0' or '1'.

Encryption of the original data OD with the BT address BT_ADDR_K of the cell phone PT as an encryption key gives the 128-bit mask data MD as shown in FIG. 4(b). The resulting mask data MD has the confidentiality protected by encryption and thus further enhances the confidentiality of the terminal random number Arn included in the encrypted terminal random number Aenc.

Any of diverse encryption routines, for example, an E21 algorithm in conformity with the BT standard, may be used for the encryption. The E21 algorithm or another encryption routine in conformity with the BT standard can efficiently share an encryption circuit or firmware of the BT communication module.

The print service providing apparatus PSV generates mask data identical with the mask data MD according to the following procedure. A control command, FHS packet, is sent from the cell phone PT to the print service providing apparatus PSV in the process of connection of the BT communication link (hereafter may be referred to as BT communication link connection process) performed in either of a 'Page' mode (Call mode) and a 'Page Response' mode (Call Response mode) described later. The FHS packet includes the BT address BT_ADDR_K and the BT clock BT_CLK_K of the cell phone PT. The print service providing apparatus PSV executes the BT communication link connection process to acquire the BT address BT_ADDR_K and the BT clock BT_CLK_K of the cell phone PT. The print service providing apparatus PSV thus generates the mask data identical with the mask data MD to extract the terminal random number Arn from the encrypted terminal random number Aenc as discussed later.

Figure 5:
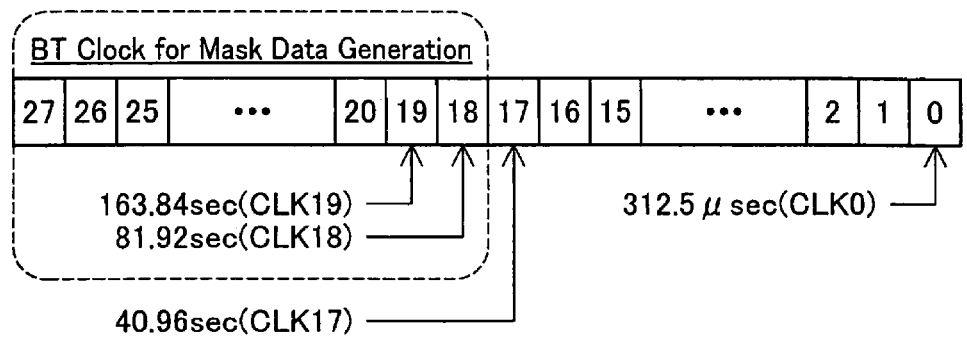
FIG. 5 shows the structure of a BT clock for mask data generation.

The 10 bits out of the 28-bit BT clock BT_CLK_K generated in the cell phone PT are used for generation of the mask data MD. FIG. 5 shows the structure of a BT clock for mask data generation.

The BT clock is specified as a 28-bit counter according to the BT standard and is incremented by one at every time interval of 312.5 μs. The print service providing apparatus PSV uses the BT address BT_ADDR_K and the BT clock BT_CLK_K of the cell phone PT acquired in the BT communication link connection process to generate the mask data identical with the mask data MD. The print service providing apparatus PSV then uses the generated mask data to extract the terminal random number Arn from the encrypted terminal random number Aenc. The value of the BT clock used for generation of the identical mask data by the print service providing apparatus PSV should be kept equal to the value of the BT clock used for generation of the mask data MD by the cell phone PT. In the event of any variation in value of the BT clock for mask data generation, the print service providing apparatus PSV does not generate the mask data identical with the mask data MD and accordingly fails to extract the accurate terminal random number Arn from the encrypted terminal random number Aenc.

The upper 10 bits out of the 27-bit BT clock BT_CLK_K are used as the BT clock for mask data generation. The values of the $18^{th}$ bit to the $27^{th}$ bit are carried corresponding to the value of the $17^{th}$ bit. When the $17^{th}$ bit is equal to '0', the 10-bit data of the $18^{th}$ bit to the $27^{th}$ bit is directly set to the BT clock for mask data generation. When the $17^{th}$ bit is equal to '1', on the other hand, the values of the $18^{th}$ bit to the $27^{th}$ bit are carried by addition of '1' to the $18^{th}$ bit. The 10-bit data of the carried $18^{th}$ bit to $27^{th}$ bit is set to the BT clock for mask data generation. This keeps the BT clock for mask data generation unchanged for a time period of at least 40.96 sec. The BT clock for mask data generation is changed after elapse of 81.92 sec at the latest. This setting desirably protects the confidentiality of the mask data MD and thereby enhances the confidentiality of the terminal random number Arn sent from the cell phone PT. The procedure of this embodiment uses the upper 10 bits of the BT clock BT_CLK_K as the BT clock for mask data generation to prohibit a change of the BT clock for approximately 40 seconds. This setting is, however, not restrictive. The number of the upper bits utilized as the BT clock for mask data generation may be decreased to, for example, the upper 9 bits or the upper 8 bits to keep the BT clock for mask data generation unchanged for a longer time period. The number of the upper bits utilized as the BT clock for mask data generation may alternatively be increased to, for example, the upper 11 bits or the upper 12 bits to allow a change of the BT clock for mask data generation at an earlier timing.

The access point IR communication module 10 receives the encrypted terminal random number Aenc sent from the terminal IR communication module 40 and transfers the encrypted terminal random number Aenc to the authentication control module 30 of the print service providing apparatus PSV (hereafter may be referred to as the access point authentication control module 30). The access point authentication control module 30 then generates 16-byte (128-bit) response data Pif and computes an exclusive OR (XOR) of the response data Pif and the encrypted terminal random number Aenc according to the Equation (2) given below to protect the confidentiality of the response data Pif and generate encrypted response data Pifenc (step S130):

$$Pifenc=(Pif)XOR(Aenc) \quad (2)$$

The encrypted response data Pifenc is sent to the terminal IR communication module 40 via the access point IR communication module 10 (step S140).

The response data Pif is generated as discussed below. FIG. 6 shows the structure of the response data Pif. The response data Pif is 16-byte (128-bit) data corresponding to payload data of the FHS packet in BT communication, and includes a 21-bit 'all zero (0)' area and 117 bits out of the payload data of the FHS packet with omission of 'Parity bits' and 'AM_ADDR'. A 48-bit BT address BT_ADDR_A of the print service providing apparatus PSV is divided into three separate sections 'LAP' representing the lower 24 bits, 'UAP' representing the upper 8 bits, and 'NAP' representing the residual 16 bits other than 'LAP' and 'UAP'. The 26 bits out of a 28-bit BT clock BT_CLK_A of the print service providing apparatus PSV with omission of the lower-most 2 bits are arranged in 'CLK$_{27-2}$'.

The terminal IR communication module 40 receives the encrypted response data Pifenc sent from the access point IR communication module 10 and transfers the encrypted response data Pif to the terminal authentication control module 60. The terminal authentication control module 60 computes an exclusive OR (XOR) of the encrypted response data Pifecn and the encrypted terminal random number Aenc according to Equation (3) given below to extract the response data Pif (step S150):

$$Pif=(Pifenc)XOR(Aenc) \qquad (3)$$

As mentioned above, the response data Pif includes the 6-byte (48-bit) BT address BT_ADDR_A of the print service providing apparatus PSV and the 26 bits out of the 28-bit BT clock BT_CLK_A of the print service providing apparatus PSV with omission of the lower-most 2 bits. The extracted response data Pif thus specifies the BT address BT_ADDR_A and the BT clock BT_CLK_A of the print service providing apparatus PSV.

The access point authentication control module 30 generates a 16-byte (128-bit) access point random number Crn and computes an exclusive OR (XOR) of the access point random number Crn and the encrypted terminal random number Aenc according to Equation (4) given below to generate a 16-byte encrypted access point random number Cenc to be sent to the cell phone PT (step S160):

$$Cenc=(Crn)XOR(Aenc) \qquad (4)$$

The encrypted access point random number Cenc is sent to the terminal IR communication module 40 via the access point IR communication module 10 (step S170).

The terminal IR communication module 40 receives the encrypted access point random number Cenc and transfers the encrypted access point random number Cenc to the terminal authentication control module 60. The terminal authentication control module 60 computes an exclusive OR (XOR) of the encrypted access point random number Cenc and the encrypted terminal random number Aenc according to Equation (5) given below to extract the access point random number Crn (step S180):

$$Crn=(Cenc)XOR(Aenc)=((Crn)XOR(Aenc))XOR(Aenc) \qquad (5)$$

As a result of the IR communication made between the cell phone PT and the print service providing apparatus PSV, the cell phone PT acquires the BT address BT_ADDR_A and the BT clock BT_CLK_A of the print service providing apparatus PSV.

On completion of the IR communication, the cell phone PT and the print service providing apparatus PSV cooperatively execute the BT communication link connection process through the operations of 'Page (Call)' and 'Page Response (Call Response)' to connect the BT communication link (step S190). The access point authentication control module 30 controls the BT communication module 20 of the print service providing apparatus PSV (hereafter may be referred to as the access point BT communication module 20). The terminal authentication control module 60 controls the BT communication module 50 of the cell phone PT (hereafter may be referred to as the terminal BT communication module 50). The BT communication link connection process is the general procedure of BT communication and is thus not specifically described here.

On connection of the BT communication link between the print service providing apparatus PSV as the BT access point and the cell phone PT as the BT terminal, the access point authentication control module 30 acquires the BT address BT_ADDR_K and the BT clock BT_CLK_K of the cell phone PT from the payload data of the FHS packet received via the access point BT communication module 200 (step S200).

The access point authentication control module 30 then uses the acquired BT address BT_ADDR_K and BT clock BT_CLK_K of the cell phone PT to generate mask data MD', which is expected to be identical with the mask data MD used for generation of the encrypted terminal random number Aenc, according to the same procedure. The access point authentication control module 30 subsequently computes an exclusive OR (XOR) of the generated mask data MD' and the encrypted terminal random number Aenc according to Equation (6) given below to extract the terminal random number Arn from the encrypted terminal random number Aenc (step S210):

$$Arn=(Aenc)XOR(MD')=((Arn)XOR(MD))XOR(MD') \qquad (6)$$

This series of processing exchanges the access point random number Crn generated by the print service providing apparatus PSV and the terminal random number Arn generated by the cell phone PT by IR communication and BT communication.

Figure 7:
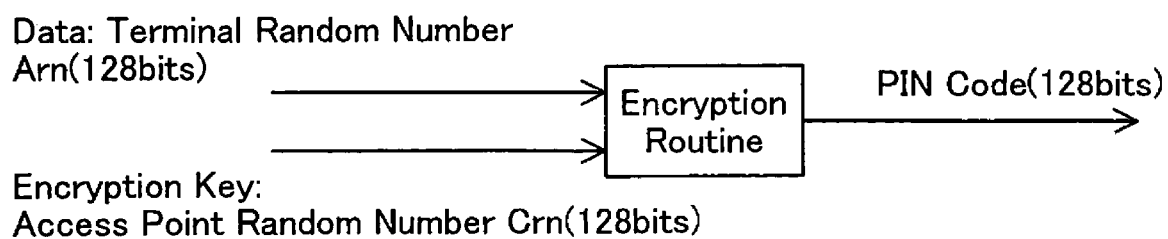
FIG. 7 shows a process of generating a PIN code.

The access point authentication control module 30 and the terminal authentication control module 60 then independently generate PIN codes. FIG. 7 shows a process of generating a PIN code. The access point authentication control module 30 encrypts the terminal random number Arn with the access point random number Crn as the encryption key (common key) to generate a PIN code (step S220*a*) as shown in FIG. 7. Similarly the terminal authentication control module 60 encrypts the terminal random number Arn with the access point random number Crn as the encryption key (common key) to generate a PIN code (step S220*b*).

Any of diverse encryption routines, for example, an E22 algorithm in conformity with the BT standard, may be used for the encryption. The E22 algorithm can efficiently share an encryption circuit or firmware of the BT communication module. The encryption process may alternatively encrypt the access point random number Crn with the terminal random number Arn as the encryption key (common key) to generate a PIN code.

After generation of the PIN codes by both the print service providing apparatus PSV and the cell phone PT, connection authentication of the BT communication link starts (step S230). This connection authentication is the general procedure of BT communication and is thus not specifically described here.

The print service providing apparatus PSV and the cell phone PT cooperatively perform the connection authentication process of the BT communication link as described above.

A.3. Effects

The print service providing apparatus PSV as the BT access point and the cell phone PT as the BT terminal cooperatively perform the connection authentication process of the BT communication link. The cell phone PT receives the BT address BT_ADDR_K and the BT clock BT_CLK_A of the print service providing apparatus PSV at the other end of connection by IR communication. The IR communication utilizes infrared radiation for the transmission medium and accordingly has high directivity and short coverage of signals. The IR communication between the cell phone PT and the print service providing apparatus PSV requires the user to be sufficiently close to the print service providing apparatus PS and to direct the IR transceiver 42 of the cell phone PT toward the IR transceiver 12 of the print service providing apparatus PSV (see FIG. 1). The user should approach to a print service providing apparatus as a target of connection and make IR communication between the user's cell phone and the print service providing apparatus. The user can thus confirm the print service providing apparatus as the target of connection, prior to actual connection of the user's cell phone to the print service providing apparatus by BT communication link. This arrangement sets the print service providing apparatus in the inquiry disable mode, instead of the conventional inquiry mode, for connection of the BT communication link and thus effectively prevents illegal, improper, and unauthorized connections described above as the drawback of the prior art technique. This arrangement also prevents personal information and other important pieces of information from being stolen from fake access points.

The cell phone PT and the print service providing apparatus PSV respectively generate the PIN codes required for mutual connection authentication from the random numbers Arn and Crn exchanged in advance by IR communication. This arrangement does not require the user to enter the PIN code. Both the terminal random number Arn generated by the cell phone PT and the access point random number Crn generated by the print service providing apparatus PSV are converted to encrypted data having the enhanced confidentiality and are exchanged by IR communication of the high directivity. One of the exchanged random numbers (the terminal access number Arn in the embodiment) is encrypted with the other of the exchanged random numbers (the access point random number Crn in the embodiment) as the encryption key (common key) to generate the PIN code. The random numbers are utilized as the original data and the encryption key for generation of the PIN code and are encrypted to have the enhanced confidentiality, prior to transmission. This arrangement ensures the high confidentiality of both the original data and the encryption key used for generation of the PIN code. Application of the preset encryption routine to generate the PIN code further enhances the confidentiality of the PIN code.

Even one fake of the terminal random number Arn acquired by the print service providing apparatus PSV, the BT address BT_ADDR_K and the BT clock BT_CLK_K of the cell phone PT, the mask data MD' generated by the print service providing apparatus PSV, the access point random number Crn acquired by the cell phone PT, and the BT address BT_ADDR_A and the BT clock BT_CLK_A of the print service providing apparatus PSV causes an inconsistency between the PIN codes generated independently by the print service providing apparatus PSV and the cell phone PT. The inconsistency leads to failed connection authentication of the cell phone PT as the BT terminal. The print service providing apparatus PSV as the BT access point then disconnects the BT communication link. In the case of successful connection authentication, on the other hand, a secret key (link key) is generated to be shared by the print service providing apparatus PSV as the BT access point and by the cell phone PT as the BT terminal. The information transmitted by BT communication is encrypted with the generated link key. This ensures the high-security BT communication.

The terminal random number Arn sent from the cell phone PT to the print service providing apparatus PSV and the access point random number Crn sent from the print service providing apparatus PSV to the cell phone PT may be captured illegally by a third party in the course of transmission by IR communication. Namely the security of these random numbers is not perfectly protected. The IR communication, however, has high directivity and is not easily captured by any third person.

The actually transmitted data by IR communication are the encrypted terminal random number Aenc and the encrypted access point random number Cenc to protect the confidentiality of the terminal random number Arn and the access point random number Crn. Even if a third party illegally captures the encrypted random numbers, it is rather difficult to extract the correct random numbers from the encrypted random numbers.

The PIN code used for connection authentication is generated according to the preset encryption routine with one of the terminal random number Arn and the access point random number Crn exchanged between the print service providing apparatus PSV and the cell phone PT as the encryption key (common key). Even if a third party succeeds in extracting the correct random numbers from the encrypted random numbers, the proper encryption routine is required to generate the genuine PIN code and succeed in connection authentication.

There is little possibility that a malicious third party succeeds in stealing information on the procedure of extracting random numbers and the encryption routine and illegally captures the IR communication to extract random numbers and generate a correct PIN code. Even in such a case, the prior authorized connection of the BT communication link and successful connection authentication well interferes with the later connection establishment and connection authentication by the malicious third party.

The print service providing system of the embodiment thus ensures easy and secure connection authentication between the print service providing apparatus PSV as the BT access point and the cell phone PT as the BT terminal.

As described above, in the print service providing system of the embodiment, the user explicitly specifies a BT access point as a target of connection to make connection of the communication link between the specified BT access point and the user's BT terminal. This arrangement also ensures easy and secure connection authentication between the BT terminal and the BT access point.

The terminal random number Arn, the access point random number Crn, and the PIN code of the embodiment are respectively equivalent to the first piece of security code generating information, the second piece of security code generating information, and the security code of the invention.

B. Second Embodiment

Figure 8:
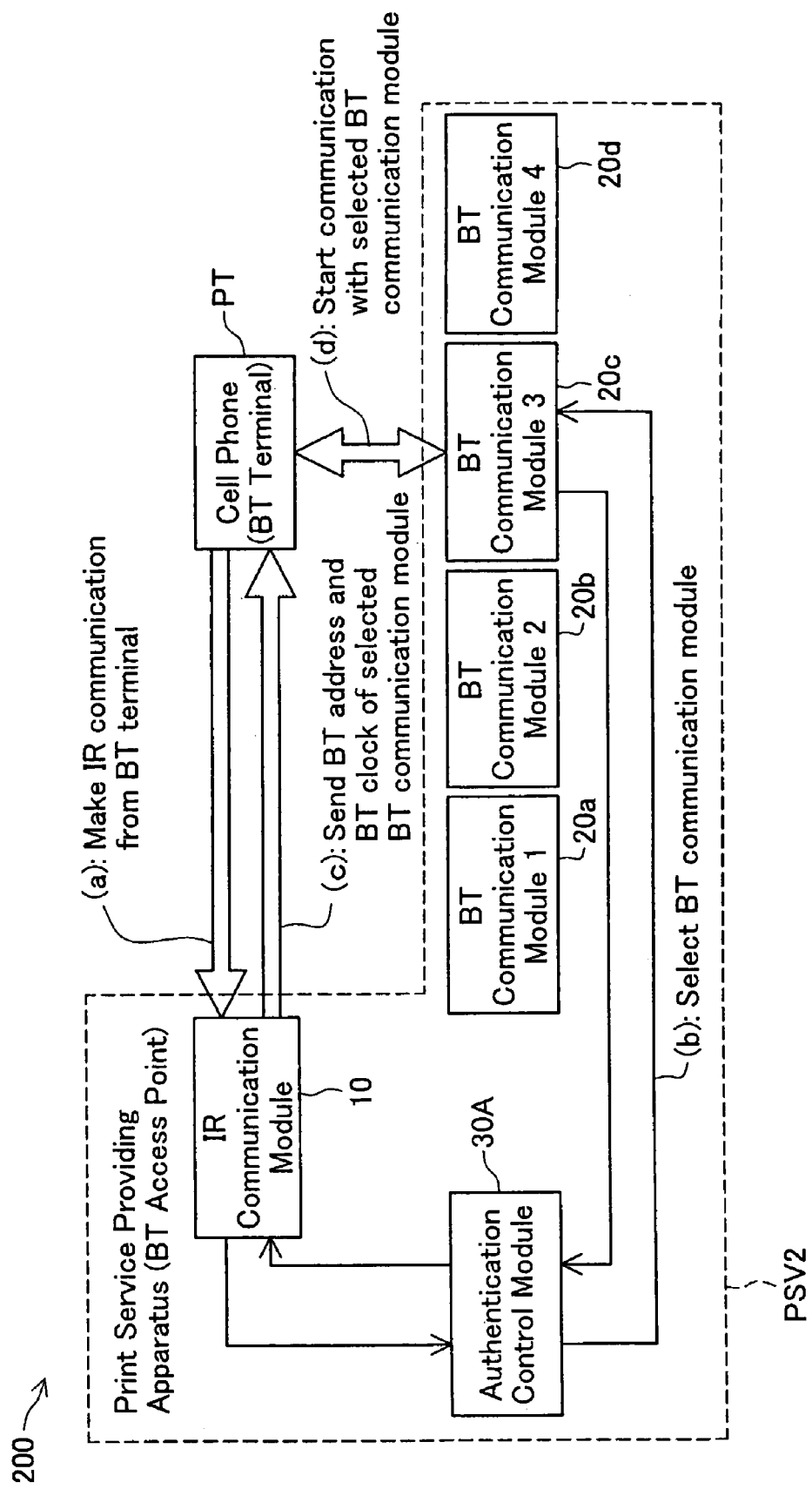
FIG. 8 schematically illustrates the configuration of a print service providing system as a second embodiment of the communication network system of the invention.

FIG. 8 schematically illustrates the configuration of a print service providing system as a second embodiment of the communication network system of the invention. Like the print service providing system 100 of the first embodiment, the print service providing system 200 of the second embodiment includes a print service providing apparatus PSV2 and a cell phone PT that is connected to the print service providing apparatus PSV2 by BT communication link. Unlike the print service providing apparatus PSV of the first embodiment, the print service providing apparatus PSV2 of the second embodiment has multiple BT communication modules, that is, four BT communication modules 20*a* to 20*d* in the illustrated example. An authentication control module 30A selects one of the multiple BT communication modules to establish BT communication with the cell phone PT.

The BT communication is made between the print service providing apparatus PSV2 of the embodiment and the cell phone PT according to the following procedure.

(a) The IR communication is made between the access point IR communication module 10 and the IR communication module 40 of the cell phone PT (see FIG. 1) according to the procedure of FIG. 2, like the first embodiment.

(b) The access point authentication control module 30A selects one of the multiple BT communication modules based on a predetermined condition. In this illustrated example, the third BT communication module 20c is selected.

(c) The access point authentication control module 30A sends a BT address of the selected BT communication module 20c to the cell phone PT via the access point IR communication module 10 according to the procedure of FIG. 2, like the first embodiment.

(d) The cell phone PT and the selected BT communication module 20c execute the connection authentication of the BT communication link and start BT communication according to the procedure of FIG. 3, like the first embodiment.

One applicable procedure of selection, for example, compares communication loads of the multiple BT communication modules and selects a BT communication module with the least communication load as a communication target of the cell phone PT. In response to a connection request of the BT communication link from a cell phone PT to the print service providing apparatus PSV2, the procedure selects a BT communication module with the least communication load among the multiple BT communication modules 20a to 20d and activates the selected BT communication module to make BT communication. This arrangement substantially equalizes the communication loads of the respective BT communication modules.

In another example, one applicable procedure of selection prohibits the selection and the use of a BT communication module connected last time for BT communication, and selects one of the remaining BT communication modules. Another applicable procedure of selection prohibits the selection and the use of a BT communication module used previously for the print service, for a preset time period and selects one of the remaining BT communication modules. The BT address of the once selected BT communication module may be intercepted by an unauthorized BT terminal in the coverage of radio waves sent from the print service providing apparatus PSV2. This arrangement effectively prevents such unauthorized accesses and enhances the security level. The procedures of these examples may be combined to select a BT communication module with the least communication load among the remaining BT communication modules. This combined arrangement effectively prevents unauthorized accesses and enhances the security level, while substantially equalizing the communication loads of the respective BT communication modules. The BT communication module prohibited for the selection and the use is preferably set not to perform the 'Page Response' operation in response to an externally requested 'Page' operation.

C. Third Embodiment

Figure 9:
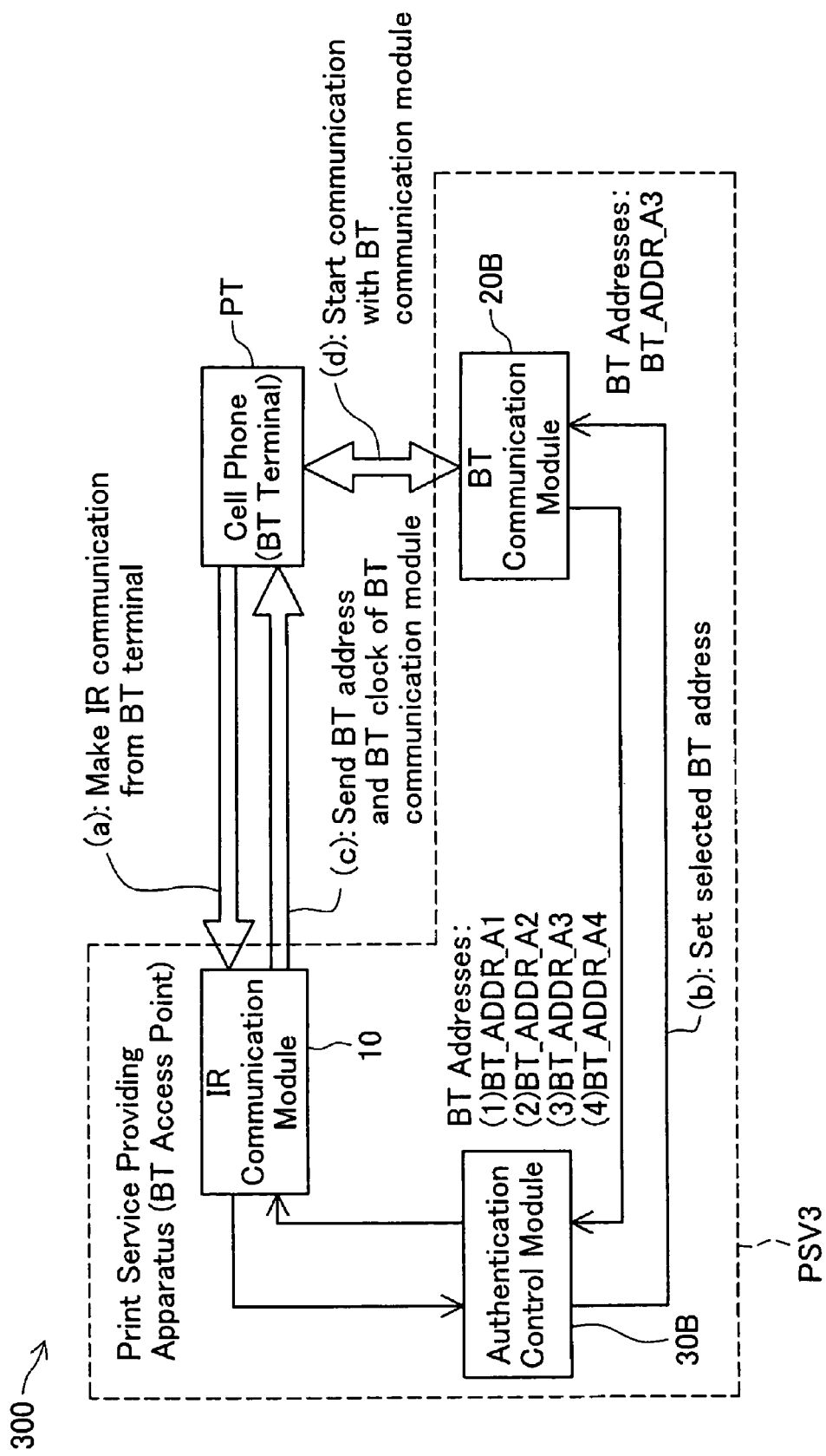
FIG. 9 schematically illustrates the configuration of a print service providing system as a third embodiment of the communication network system of the invention.

FIG. 9 schematically illustrates the configuration of a print service providing system as a third embodiment of the communication network system of the invention. Like the print service providing system 100 of the first embodiment, the print service providing system 300 of the third embodiment includes a print service providing apparatus PSV3 and a cell phone PT that is connected to the print service providing apparatus PSV3 by BT communication link. The print service providing apparatus PSV3 of the third embodiment includes the IR communication module 10, a BT communication module 20B, and an authentication control module 30B and basically has the same structure as that of the print service providing apparatus PSV of the first embodiment. In the structure of the third embodiment, however, the authentication control module 30B stores multiple BT addresses settable in the BT communication module 20B, that is, four BT addresses BT_ADDR_A1 to BT_ADDR_A4 in the illustrated example, in a non-illustrated memory. One of the multiple BT addresses is selected and is set in the BT communication module 20B.

The BT communication is made between the print service providing apparatus PSV3 of the embodiment and the cell phone PT according to the following procedure.

(a) The IR communication is made between the access point IR communication module 10 and the IR communication module 40 of the cell phone PT (see FIG. 1) according to the procedure of FIG. 2, like the first embodiment.

(b) The access point authentication control module 30B selects one of the multiple BT addresses based on a predetermined condition and sets the selected BT address in the BT communication module 20B. In this illustrated example, the third BT address BT_ADDR_A3 is selected.

(c) The access point authentication control module 30B sends the selected BT address BT_ADDR_A3 to the cell phone PT via the access point IR communication module 10 according to the procedure of FIG. 2, like the first embodiment.

(d) The cell phone PT and the BT communication module 20B execute the connection authentication of the BT communication link and start BT communication according to the procedure of FIG. 3, like the first embodiment.

One applicable method of selection, for example, takes into account the use statuses of the multiple BT addresses provided as possible options and selects one BT address that has not been used for a longest time period. This method exerts some effects discussed below.

The once selected BT address of the BT communication module may be intercepted by an unauthorized BT terminal in the coverage of radio waves sent from the print service providing apparatus PSV3. The prohibited use of the once selected BT address for some time period effectively prevents such unauthorized accesses and enhances the security level. This arrangement also reduces the potential for unauthorized access by any illegal user having information on the BT address of the print service providing apparatus PSV3 given by a legal user who has once received the print service. It is highly probable that a different BT address from the notified BT address is set in the BT communication module 20B when the illegal user tries to make access.

The structure of the third embodiment may additionally have multiple BT communication modules, like the structure of the second embodiment. This additional modification flexibly protects the security, while substantially equalizing the communication loads of the respective BT communication modules.

D. Fourth Embodiment

Figure 10:
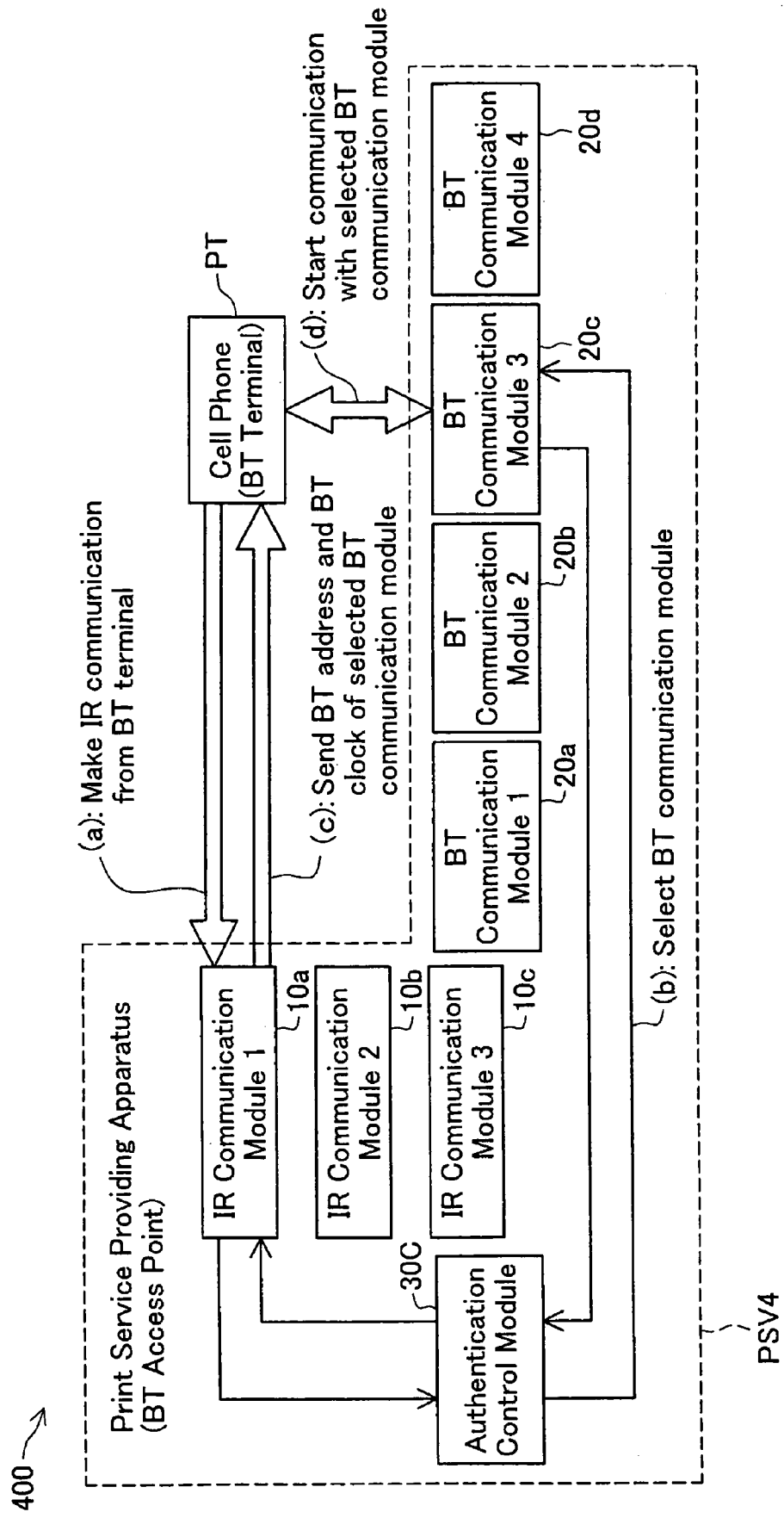
FIG. 10 schematically illustrates the configuration of a print service providing system as a fourth embodiment of the communication network system of the invention.

FIG. 10 schematically illustrates the configuration of a print service providing system as a fourth embodiment of the communication network system of the invention. Like the print service providing system 100 of the first embodiment, the print service providing system 400 of the fourth embodiment includes a print service providing apparatus PSV4 and a cell phone PT that is connected to the print service providing apparatus PSV4 by BT communication link. The print service providing apparatus PSV4 of the fourth embodiment includes multiple BT communication modules, that is, four BT communication modules 20a to 20d in the illustrated example, like the print service providing apparatus PSV2 of the second embodiment, and multiple IR communication modules, that is, three IR communication modules 10a to 10c in the illustrated example. Unlike the print service providing apparatus PSV of the first embodiment and the print service providing apparatus PSV2 of the second embodiment, an authentication control module 30C of this embodiment controls an IR communication module that establishes IR communication with the cell phone PT and selects a BT communication module to establish BT communication with the cell phone PT.

The print service providing system 400 of this embodiment may be installed, for example, in a family restaurant. An IR communication module may be located at each table in the family restaurant. The user seated at a table directs the IR communication module of the user's cell phone PT toward the IR communication module located at the table to request a print service. The authentication control module 30C of the print service providing apparatus PSV4 specifies the user requesting the print service according to the location of the IR communication module at the table that establishes IR communication with the user's cell phone PT. The authentication control module 30C subsequently selects one of the multiple BT communication modules for providing the print service according to the location of the table. The BT communication is then made between the print service providing apparatus PSV4 and the cell phone PT.

(a) The IR communication is made between an access point IR communication module and the IR communication module 40 of the cell phone PT (see FIG. 1) according to the procedure of FIG. 2, like the first embodiment. In this illustrated example, the IR communication is made between the first IR communication module 10a and the IR communication module 40 of the cell phone PT.

(b) The access point authentication control module 30C selects one of the multiple BT communication modules based on a predetermined condition. In this illustrated example, the third BT communication module 20c is selected.

(c) The access point authentication control module 30C sends a BT address of the selected BT communication module 20c to the cell phone PT via the first access point IR communication module 10a according to the procedure of FIG. 2, like the first embodiment.

(d) The cell phone PT and the selected BT communication module 20c execute the connection authentication of the BT communication link and start BT communication according to the procedure of FIG. 3, like the first embodiment.

One applicable procedure of selection, for example, selects a BT communication module that is closest in position to the access point IR communication module involved in the IR communication with the cell phone PT and has the least communication load, as a communication target of the cell phone PT.

In this illustrated example, the BT communication module with the least communication load is selected among the multiple BT communication modules as possible options. The selected BT communication module is used to make BT communication. This arrangement substantially equalizes the communication loads of the respective BT communication modules.

The selected BT communication module is closest in position to the IR communication module involved in the IR communication with the cell phone BT. Selection of the BT communication module closest in position to the user in a relatively wide area of service coverage as in the family restaurant desirably ensures stable communication with the sufficiently high radio field intensity.

The structure of the fourth embodiment may additionally provide multiple BT addresses as available options and set a selected BT address in the BT communication module, like the structure of the third embodiment. This additional modification flexibly protects the security, while ensuring stable communication with the selected BT communication module closest to the user and substantially equalizing the communication loads of the respective BT communication modules.

E. Fifth Embodiment

The control procedure of the first embodiment causes both the BT access point and the BT terminal to independently generate PIN codes with the mutually exchanged common key as the encryption key. This arrangement ensures easy and high-security connection authentication between the BT terminal and the BT access point. According to another available control procedure discussed below, the BT access point encrypts a PIN code with a public key sent from the BT terminal and sends the encrypted PIN code to the BT terminal. The BT terminal then receives the encrypted PIN code and decrypts the encrypted PIN code with a secret key. This arrangement also ensures high-security connection authentication between the BT terminal and the BT access point.

Figure 11:
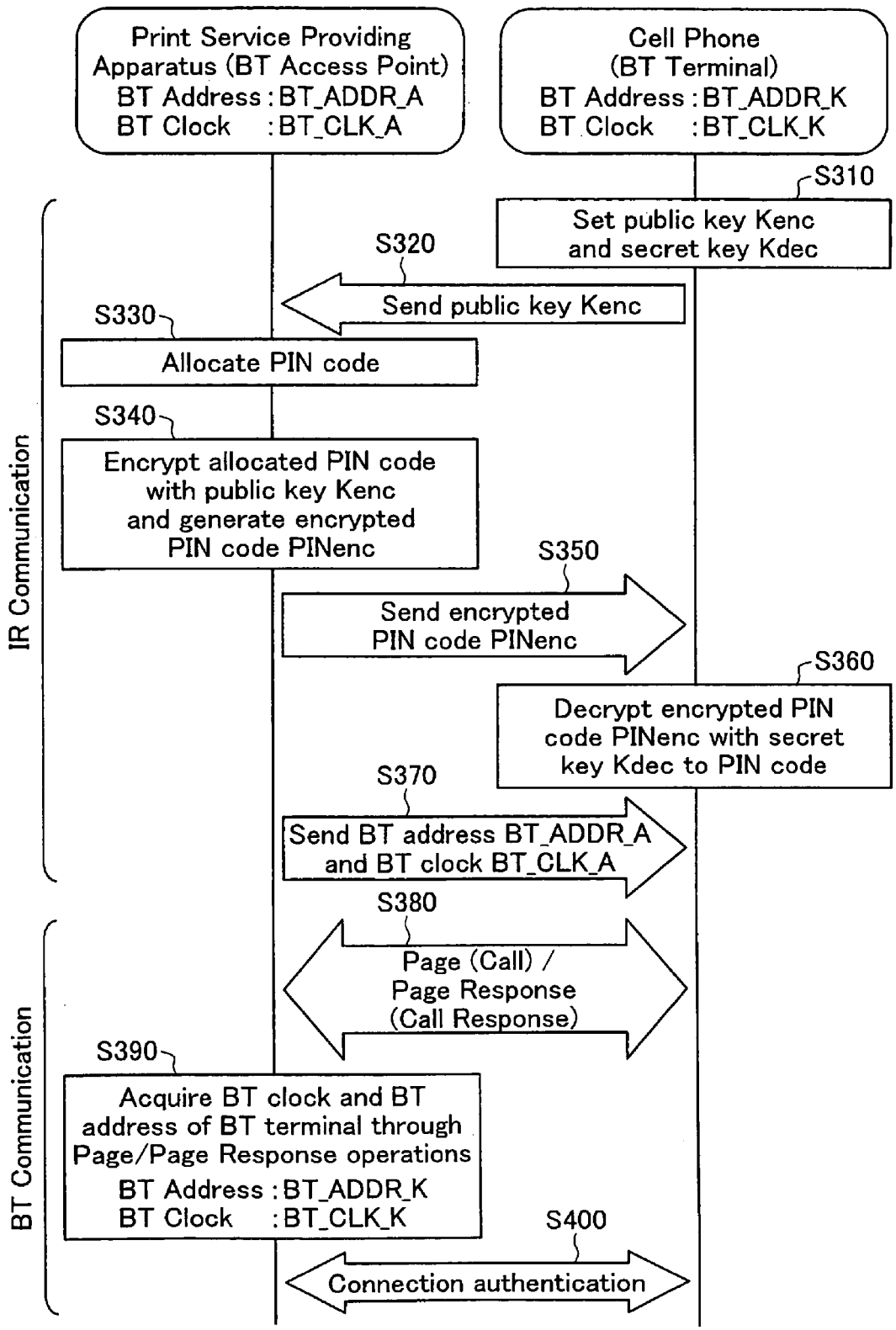
FIG. 11 shows a procedure of connection authentication performed between the print service providing apparatus PSV and the cell phone PT in a fifth embodiment.

FIG. 11 shows a procedure of connection authentication performed between the print service providing apparatus PSV and the cell phone PT in a fifth embodiment. The structures of the print service providing apparatus PSV and the cell phone PT are basically identical with those of the first embodiment (see FIG. 1), except that the control procedure of the respective functional blocks follows a processing flow of FIG. 11.

The user of the cell phone PT directs an IR transceiver 42 (see FIG. 1) included in the IR communication module 40 of the cell phone PT toward an IR transceiver 12 (see FIG. 1) included in the IR communication module 10 of the print service providing apparatus PSV and operates a connection authentication start button (not shown) to start IR communication according to the procedure of FIG. 11. BT communication is then made to perform connection authentication of the BT communication link via a BT transceiver 52 (see FIG. 1) included in the BT communication module 50 of the cell phone PT and a BT transceiver 22 (see FIG. 1) included in the BT communication module 20 of the print service providing apparatus PSV.

The terminal authentication control module 60 of the cell phone PT first sets a public key Kenc and a secret key Kdec (step S310). The public key Eenc and the secret key Kdec may not be changed each time but may be fixed. The set public key Kenc is sent from the terminal IR communication module 40 of the cell phone PT to the access point IR communication module 10 of the print service providing apparatus PSV (Step S320).

The access point IR communication module 10 receives the public key Kenc sent from the terminal IR communication module 40 and transfers the received public key Kenc to the access point authentication control module 30.

The access point authentication control module 30 allocates a PIN code to the cell phone PT (step S330) and encrypts the allocated PIN code with the received public key Kenc (step S340). The preferable procedure allocates a different PIN code to the cell phone PT each time. The encrypted PIN code PINenc is sent from the access point IR communication module 10 to the terminal IR communication module 40 (step S350). The known RSA public key cryptography is applied for encryption with the public key. The RSA public key cryptography takes advantage of difficulty in prime factorization of an extremely large number.

The terminal IR communication module 40 receives the encrypted PIN code PINenc sent from the access point IR communication module 10 and transfers the encrypted PIN code PINenc to the terminal authentication control module 60.

The terminal authentication control module 60 decrypts the encrypted PIN code PINenc with the secret key Kdec to the PIN code (step S360).

The access point authentication control module 30 then sends a BT address BT_ADDR_A and a BT clock BT_CLK_A of the print service providing apparatus PSV to the terminal IR communication module 40 via the access point IR communication module 10 (step S370).

The terminal IR communication module 40 transfers the received BT address BT_ADDR_A and the received BT clock BT_CLK_A of the print service providing apparatus PSV to the terminal authentication control module 60. The terminal authentication control module 60 accordingly acquires the BT address BT_ADDR_A and the BT clock BT_CLK_A of the print service providing apparatus PSV.

On completion of the IR communication, BT communication is made between the cell phone PT as the BT terminal and the print service providing apparatus PSV as the BT access point.

The access point authentication control module 30 of the print service providing apparatus PSV as the BT access point controls the access point BT communication module 20. The terminal authentication control module 60 of the cell phone PT as the BT terminal controls the terminal BT communication module 50. In this manner, the cell phone PT and the print service providing apparatus PSV cooperatively execute the BT communication link connection process through the operations of 'Page (Call)' and 'Page Response (Call Response)' to connect the BT communication link (step S380).

On connection of the BT communication link between the print service providing apparatus PSV as the BT access point and the cell phone PT as the BT terminal, the access point authentication control module 30 acquires a BT address BT_ADDR_K and a BT clock BT_CLK_K of the cell phone PT from the payload data of the FHS packet received via the access point BT communication module 200 (step S390).

The cell phone PT decrypts the PIN code allocated and encrypted by the print service providing apparatus PSV. The cell phone PT and the print service providing apparatus PSV mutually exchange the BT addresses and the BT clocks and utilize these pieces of information to cooperatively perform the connection authentication process of the BT communication link (step S230).

As described above, in the structure of this embodiment, the print service providing apparatus PSV as the BT access point and the cell phone PT as the BT terminal cooperatively perform the connection authentication process of the BT communication link. The cell phone PT receives the BT address BT_ADDR_K and the BT clock BT_CLK_A of the print service providing apparatus PSV at the other end of connection by IR communication. The user can confirm the print service providing apparatus as the target of connection, prior to actual connection of the user's cell phone to the print service providing apparatus by BT communication link. This arrangement sets the print service providing apparatus in the inquiry disable mode, instead of the conventional inquiry mode, for connection of the BT communication link and thus effectively prevents illegal, improper, and unauthorized connections described above as the drawback of the prior art technique. This arrangement also prevents personal information and other important pieces of information from being stolen from fake access points.

The PIN code used for connection authentication between the cell phone PT as the BT terminal and the print service providing apparatus PSV as the BT access point is encrypted with the public key. The information representing the encrypted PIN code is sent from the print service providing apparatus PSV to the cell phone PT by IR communication. This arrangement ensures the high confidentiality of the PIN code.

The print service providing system of this embodiment thus enables easy and high-security connection authentication between the print service providing apparatus PSV as the BT access point and the cell phone PT as the BT terminal. The public key cryptography requires relatively complicated operations of encryption and decryption and is thus not suitable for the apparatus with a CPU of a relatively low throughput. The symmetric key cryptography of the first embodiment, on the other hand, has relatively simple operations and is thus advantageously applicable to the apparatus with a CPU of a relatively low throughput.

The above description regards the connection authentication process of the fifth embodiment applied to the print service providing system of the first embodiment. The connection authentication process of the fifth embodiment is also applicable to the print service providing system of the second embodiment, which has multiple BT communication modules and selects one BT communication module based on a predetermined condition. The connection authentication process of the fifth embodiment is also applicable to the print service providing system of the third embodiment, which has multiple BT addresses and selects one BT address based on a predetermined condition. The connection authentication process of the fifth embodiment is also applicable to the print service providing system of the fourth embodiment, which has multiple BT communication modules and multiple IR communication modules and selects one BT communication module based on a predetermined condition. The connection authentication process of the fifth embodiment is also applicable to a print service providing system of the combined configuration, which has multiple BT communication modules and multiple BT addresses and selects one BT communication module based on a predetermined first condition and one BT address based on a predetermined second condition.

F. Sixth Embodiment

According to still another available control procedure discussed below, the BT terminal encrypts a PIN code with a public key sent from the BT access point and sends the encrypted PIN code to the BT access point. The BT access point then receives the encrypted PIN code and decrypts the encrypted PIN code with a secret key. This arrangement also ensures high-security connection authentication between the BT terminal and the BT access point.

FIG. 12 shows a procedure of connection authentication performed between the print service providing apparatus PSV and the cell phone PT in a sixth embodiment. The structures of the print service providing apparatus PSV and the cell phone PT are basically identical with those of the first embodiment (see FIG. 1), except that the control procedure of the respective functional blocks follows a processing flow of FIG. 11.

The user of the cell phone PT directs an IR transceiver 42 (see FIG. 1) included in the IR communication module 40 of the cell phone PT toward an IR transceiver 12 (see FIG. 1) included in the IR communication module 10 of the print service providing apparatus PSV and operates a connection authentication start button (not shown) to start IR communication according to the procedure of FIG. 12. BT communication is then made to perform connection authentication of the BT communication link via a BT transceiver 52 (see FIG. 1) included in the BT communication module 50 of the cell phone PT and a BT transceiver 22 (see FIG. 1) included in the BT communication module 20 of the print service providing apparatus PSV.

The terminal authentication control module 60 of the cell phone PT first sends a transmission request command of a public key used for encryption of a PIN code via the terminal IR communication module 40 of the cell phone PT to the access point IR communication module 10 of the print service providing apparatus PSV (step S410).

The access point IR communication module 10 receives the public key transmission request command sent from the terminal IR communication module 40 and transfers the received public key transmission request command to the access point authentication control module 30.

The access point authentication control module 30 sets the public key Kenc and the secret key Kdec (step S420) and sends the set public key Kenc via the access point IR communication module 10 to the terminal IR communication module 40 (step S430).

The terminal IR communication module 40 receives the public key Kenc sent from the access point IR communication module 10 and transfers the received public key Kenc to the terminal authentication control module 60.

The terminal authentication control module 60 of the cell phone PT allocates a PIN code to the print service providing apparatus PSV (step S440) and encrypts the allocated PIN code with the public key Kenc (step S450). The preferable procedure allocates a different PIN code to the print service providing apparatus PSV each time. The encrypted PIN code PINenc is sent from the terminal IR communication module 40 to the access point IR communication module 10 (step S460). The known RSA public key cryptography is applied for encryption with the public key in the same manner as the fifth embodiment.

The access point IR communication module 10 receives the encrypted PIN code PINenc sent from the terminal IR communication module 40 and transfers the encrypted PIN code PINenc to the access point authentication control module 30.

The access point authentication control module 30 decrypts the encrypted PIN code PINenc with the secret key Kdec to the PIN code (step S470).

The access point authentication control module 30 then sends a BT address BT_ADDR_A and a BT clock BT_CLK_A of the print service providing apparatus PSV to the terminal IR communication module 40 via the access point IR communication module 10 (step S480).

The terminal IR communication module 40 transfers the received BT address BT_ADDR_A and the received BT clock BT_CLK_A of the print service providing apparatus PSV to the terminal authentication control module 60. The terminal authentication control module 60 accordingly acquires the BT address BT_ADDR_A and the BT clock BT_CLK_A of the print service providing apparatus PSV.

On completion of the IR communication, BT communication is made between the cell phone PT as the BT terminal and the print service providing apparatus PSV as the BT access point.

The access point authentication control module 30 of the print service providing apparatus PSV as the BT access point controls the access point BT communication module 20. The terminal authentication control module 60 of the cell phone PT as the BT terminal controls the terminal BT communication module 50. In this manner, the cell phone PT and the print service providing apparatus PSV cooperatively execute the BT communication link connection process through the operations of 'Page (Call)' and 'Page Response (Call Response)' to connect the BT communication link (step S490).

On connection of the BT communication link between the print service providing apparatus PSV as the BT access point and the cell phone PT as the BT terminal, the access point authentication control module 30 acquires a BT address BT_ADDR_K and a BT clock BT_CLK_K of the cell phone PT from the payload data of the FHS packet received via the access point BT communication module 200 (step S500).

The print service providing apparatus PSV decrypts the PIN code allocated and encrypted by the cell phone PT. The cell phone PT and the print service providing apparatus PSV mutually exchange the BT addresses and the BT clocks and utilize these pieces of information to cooperatively perform the connection authentication process of the BT communication link (step S510).

As described above, in the structure of this embodiment, the print service providing apparatus PSV as the BT access point and the cell phone PT as the BT terminal cooperatively perform the connection authentication process of the BT communication link. The cell phone PT receives the BT address BT_ADDR_K and the BT clock BT_CLK_A of the print service providing apparatus PSV at the other end of connection by IR communication. The user can confirm the print service providing apparatus as the target of connection, prior to actual connection of the user's cell phone to the print service providing apparatus by BT communication link. This arrangement sets the print service providing apparatus in the inquiry disable mode, instead of the conventional inquiry mode, for connection of the BT communication link and thus effectively prevents illegal, improper, and unauthorized connections described above as the drawback of the prior art technique. This arrangement also prevents personal information and other important pieces of information from being stolen from fake access points.

The PIN code used for connection authentication between the cell phone PT as the BT terminal and the print service providing apparatus PSV as the BT access point is encrypted with the public key. The information representing the encrypted PIN code is sent from the cell phone PT to the print service providing apparatus PSV by IR communication. This arrangement ensures the high confidentiality of the PIN code.

The print service providing system of this embodiment thus enables easy and high-security connection authentication between the print service providing apparatus PSV as the BT access point and the cell phone PT as the BT terminal.

In both the systems of the fifth embodiment and the sixth embodiment, the PIN code is encrypted with the public key (encryption key) and is sent by IR communication. In the structure of the fifth embodiment, the print service providing apparatus PSV encrypts the PIN code with the public key, while the cell phone PT decrypts the encrypted PIN code with the secret key (decryption key). In the structure of the sixth embodiment, however, the cell phone PT encrypts the PIN code with the public key, while the print service providing apparatus PSV decrypts the encrypted PIN code with the secret key.

The public key RAS cryptography requires more complicated operations for decryption than those for encryption and takes a significantly longer processing time for decryption. For example, the decryption time is about 26 relative to the encryption time of 1. The cell phone PT generally has a low-speed CPU of a relatively low throughput. As in the structure of the fifth embodiment, it is highly probable that decryption of the encrypted PIN code by the cell phone PT thus requires the extended processing time. In the structure of the sixth embodiment, on the other hand, the cell phone PT takes charge of encryption of the PIN code, and the print service providing apparatus PSV takes charge of decryption of the encrypted PIN code. Namely decryption of the encrypted PIN code is advantageously performed by the print service providing apparatus PSV, which generally has a high-speed CPU of a relatively high throughput.

The above description regards the connection authentication process of the sixth embodiment applied to the print service providing system of the first embodiment. The connection authentication process of the sixth embodiment is also applicable to the print service providing system of the second embodiment, which has multiple BT communication modules and selects one BT communication module based on a predetermined condition. The connection authentication process of the sixth embodiment is also applicable to the print service providing system of the third embodiment, which has multiple BT addresses and selects one BT address based on a predetermined condition. The connection authentication process of the sixth embodiment is also applicable to the print service providing system of the fourth embodiment, which has multiple BT communication modules and multiple IR communication modules and selects one BT communication module based on a predetermined condition. The connection authentication process of the sixth embodiment is also applicable to a print service providing system of the combined configuration, which has multiple BT communication modules and multiple BT addresses and selects one BT communication module based on a predetermined first condition and one BT address based on a predetermined second condition.

G. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

G1. Modified Example 1

The above embodiments describe the print service providing system including the print service providing apparatus as the BT access point and the cell phone as the BT terminal as examples of the communication network system of the invention. The technique of the invention is, however, not restricted to such print service providing systems, but is applicable to diversity of communication network systems utilizing BT communication, for example, various service providing systems including any of various service providing apparatuses as the BT access point and any of various wireless terminals as the BT terminal.

G2. Modified Example 2

The above embodiments regard BT communication network systems. The BT standard is, however, not essential, and the technique of the invention is applicable to communication network systems of various other wireless communication standards.

G3. Modified Example 3

The network systems of the above embodiments make IR communication that uses infrared radiation of directivity for the communication medium. The IR communication is, however, not essential, and directional communication may utilize any of diverse communication media having directivity, for example, visible rays, ultrasonic waves, and lasers.

G4. Modified Example 4

The respective functions and constituents of each embodiment may be actualized by a hardware configuration or by a combination of a hardware configuration and a software configuration. The computer executes relevant computer programs stored in a non-illustrated memory device to attain the software configuration.

What is claimed is:

1. A connection authentication method of a specific wireless communication link between a wireless station and at least one wireless terminal, the connection authentication method comprising the steps of:
   (a) in response to reception of a first piece of security code generating information for generation of a security code, which is used for connection authentication of the specific wireless communication link, from the wireless terminal by directional wireless communication utilizing a directional communication medium, causing the wireless station to send wireless station ID information used for connection of the specific wireless communication link to the wireless terminal by the directional wireless communication and to send a second piece of security code generating information for generation of the security code to the wireless terminal by the directional wireless communication;
   (b) causing the wireless station to encrypt one of the first and the second pieces of security code generating information with the other of the first and the second pieces of security code generating information as an encryption key and thereby generate the security code; and
   (c) when the wireless terminal receives both the wireless station ID information and the second piece of security code generating information, which are sent from the wireless station by the directional wireless communication, after transmission of the first piece of security code generating information to the wireless station by the directional wireless communication, causing the wireless terminal to encrypt one of the first and the second pieces of security code generating information with the other of the first and the second pieces of security code generating information as the encryption key and thereby generate the security code; and
   wherein said specific wireless communication is Bluetooth wireless communication and the directional wireless communication is infrared wireless communication, and
   the security code is a Personal Identification Number (PIN) code which is used for the connection authentication of the specific wireless communication link, and
   wherein the wireless station comprises multiple wireless communication units,
   when the wireless station receives the first piece of security code generating information, the wireless station selects one wireless communication unit among the multiple wireless communication units based on a preset first condition, as a first wireless communication module, the wireless station selects one piece of the wireless station ID information among multiple pieces of the wireless station ID information provided in advance as possible options for the wireless communication unit selected as the first wireless communication module based on a preset second condition, and sets the selected piece of the wireless station ID information in the first wireless communication module, the preset first condition includes at least one of selecting the wireless communication unit having the least communication load among the multiple wireless communication units and selecting one of the remaining wireless communication units other than the previous wireless communication unit used to thereby prevent consecutive selection of any identical wireless communication unit, and the preset second condition includes selecting the piece of the wireless station ID information that has not been used for a longest time period.

2. A connection authentication method in accordance with claim 1, wherein the wireless terminal computes an exclusive OR of the first piece of security code generating information and preset mask information to generate an encrypted first piece of security code generating information and sends the encrypted first piece of security code generating information to the wireless station.

3. A connection authentication method in accordance with claim 2, wherein the preset mask information is generated by encrypting at least data generated according to wireless terminal ID information used for connection of the specific wireless communication link.

4. A connection authentication method in accordance with claim 2, wherein the wireless station computes an exclusive OR of the second piece of security code generating information and the encrypted first piece of security code generating information to generate an encrypted second piece of security code generating information and sends the encrypted second piece of security code generating information to the wireless terminal.

5. A wireless communication network system comprising a wireless station and at least one wireless terminal connected to the wireless station via a specific wireless communication link, the wireless station comprising:

a first directional wireless communication module that establishes directional wireless communication utilizing a directional communication medium with the wireless terminal;

a first wireless communication module that establishes specified wireless communication via the specific wireless communication link with the wireless terminal; and a first authentication control module that controls the first directional wireless communication module and the first wireless communication module and performs connection authentication of the specific wireless communication link with the wireless terminal, the wireless terminal comprising:

a second directional wireless communication module that establishes the directional wireless communication with the wireless station;

a second wireless communication module that establishes the specified wireless communication with the wireless station; and a second authentication control module that controls the second directional wireless communication module and the second wireless communication module and performs connection authentication of the specific wireless communication link with the wireless station, when the first directional wireless communication module of the wireless station receives a first piece of security code generating information for generation of a security code, which is used for connection authentication of the specific wireless communication link, from the second directional wireless communication module of the wireless terminal, the first authentication control module causing wireless station ID information used for connection of the specific wireless communication link and a second piece of security code generating information for generation of the security code to be sent from the first directional wireless communication module to the second directional wireless communication module, the first authentication control module encrypting one of the first and the second pieces of security code generating information with the other of the first and the second pieces of security code generating information as an encryption key and thereby generating the security code, when the second directional wireless communication module of the wireless terminal receives both the wireless station ID information and the second piece of security code generating information, which are sent from the first directional wireless communication module of the wireless station, after transmission of the first piece of security code generating information from the second directional wireless communication module of the wireless terminal to the first directional wireless communication module of the wireless station, the second authentication control module encrypting one of the first and the second pieces of security code generating information with the other of the first and the second pieces of security code generating information as the encryption key and thereby generating the security code; and wherein said specific wireless communication is Bluetooth wireless communication and the directional wireless communication is infrared wireless communication, and the security code is a Personal Identification Number (PIN) code which is used for the connection authentication of the specific wireless communication link, and wherein the first wireless communication module comprises multiple wireless communication units, when the first directional wireless communication module of the wireless station receives the first piece of security code generating information, the first authentication control module selects one wireless communication unit among the multiple wireless communication units based on a preset first condition, as the first wireless communication module, the first authentication control module selects one piece of the wireless station ID information among multiple pieces of the wireless station ID information provided in advance as possible options for the wireless communication unit selected as the first wireless communication module based on a preset second condition, and sets the selected piece of the wireless station ID information in the first wireless communication module, the preset first condition includes at least one of selecting the wireless communication unit having the least communication load among the multiple wireless communication units and selecting one of the remaining wireless communication units other than the previous wireless communication unit used to thereby prevent consecutive selection of any identical wireless communication unit, and the preset second condition includes selecting the piece of the wireless station ID information that has not been used for a longest time period.

6. A wireless communication network system in accordance with claim 5, wherein the first wireless communication module comprises multiple wireless communication units having different pieces of the wireless station ID information, when the first directional wireless communication module of the wireless station receives the first piece of security code generating information, the first authentication control module selects one wireless communication unit among the multiple wireless communication units based on a preset first condition, as the first wireless communication module.

7. A wireless communication network system in accordance with claim 5, wherein when the first directional wireless communication module of the wireless station receives the first piece of security code generating information, the first authentication control module selects one piece of the wireless station ID information among multiple pieces of the wireless station ID information provided in advance as possible options based on a preset condition, and sets the selected piece of the wireless station ID information in the first wireless communication module.

8. A wireless communication network system in accordance with claim 5, wherein the first directional wireless communication module comprises multiple directional wireless communication units to make the directional wireless communication with multiple wireless terminals.

9. A wireless station that is connected with at least one wireless terminal via a specific wireless communication link, the wireless station comprising:

a directional wireless communication module that establishes directional wireless communication utilizing a directional communication medium with the wireless terminal;

a wireless communication module that establishes specified wireless communication via the specific wireless communication link with the wireless terminal; and an authentication control module that controls the directional wireless communication module and the wireless communication module and performs connection authentication of the specific wireless communication link with the wireless terminal, when the directional wireless communication module receives a first piece of security code generating information for generation of a security code, which is used for connection authentication of the specific wireless communication link, from the wireless terminal, the authentication control module causing wireless station ID information used for connection of the specific wireless communication link and a second piece of security code generating information for generation of the security code to be sent from the directional wireless communication module to the wireless terminal, the authentication control module encrypting one of the first and the second pieces of security code generating information with the other of the first and the second pieces of security code generating information as an encryption key and thereby generating the security code; and wherein said specific wireless communication is Bluetooth wireless communication and the directional wireless communication is infrared wireless communication, and the security code is a Personal Identification Number (PIN) code which is used for the connection authentication of the specific wireless communication link, and wherein the wireless communication module comprises multiple wireless communication units, when the directional wireless communication module of the wireless station receives the first piece of security code generating information, the authentication control module selects one wireless communication unit among the multiple wireless communication units based on a preset first condition, as the wireless communication module, the authentication control module selects one piece of the wireless station ID information among multiple pieces of the wireless station ID information provided in advance as possible options for the wireless communication unit selected as the wireless communication module based on a preset second condition, and sets the selected piece of the wireless station ID information in the wireless communication module, the preset first condition includes at least one of selecting the wireless communication unit having the least communication load among the multiple wireless communication units and selecting one of the remaining wireless communication units other than the previous wireless communication unit used to thereby prevent consecutive selection of any identical wireless communication unit, and the preset second condition includes selecting the piece of the wireless station ID information that has not been used for a longest time period.

10. A wireless terminal that is connected to a wireless station via a specific wireless communication link, the wireless terminal comprising:

a directional wireless communication module that establishes directional wireless communication utilizing a directional communication medium with the wireless station;

a wireless communication module that establishes specified wireless communication via the specific wireless communication link with the wireless station; and an authentication control module that controls the directional wireless communication module and the wireless communication module and performs connection authentication of the specific wireless communication link with the wireless station, after transmission of a first piece of security code generating information for generation of a security code, which is used for connection authentication of the specific wireless communication link, from the directional wireless communication module to the wireless station, when the directional wireless communication module receives both wireless station ID information used for connection of the specific wireless communication link and a second piece of security code generating information for generation of the security code, which are sent from the wireless station by the directional wireless communication, the authentication control module encrypting one of the first and the second pieces of security code generating information with the other of the first and the second pieces of security code generating information as an encryption key and thereby generating the security code; and wherein said specific wireless communication is Bluetooth wireless communication and the directional wireless communication is infrared wireless communication, and the security code is a Personal Identification Number (PIN) code which is used for the connection authentication of the specific wireless communication link: and wherein the wireless station comprises multiple wireless communication units, when the wireless station receives the first piece of security code generating information, the wireless station selects one wireless communication unit among the multiple wireless communication units based on a preset first condition, as a first wireless communication module, the wireless station selects one piece of the wireless station ID information among multiple pieces of the wireless station ID information provided in advance as possible options for the wireless communication unit selected as the first wireless communication module based on a preset second condition, and sets the selected piece of the wireless station ID information in the first wireless communication module, the preset first condition includes at least one of selecting the wireless communication unit having the least communication load among the multiple wireless communication units and selecting one of the remaining wireless communication units other than the previous wireless communication unit used to thereby prevent consecutive selection of any identical wireless communication unit, and the preset second condition includes selecting the piece of the wireless station ID information that has not been used for a longest time period.

11. In a wireless station connected with at least one wireless terminal via a specific wireless communication link, a computer program product that causes a computer to perform connection authentication of the specific wireless communication link, the computer program product comprising: a first program code that, in response to reception of a first piece of security code generating information for generation of a security code, which is used for connection authentication of the specific wireless communication link, from the wireless terminal by directional wireless communication utilizing a directional communication medium, causes the computer to send wireless station ID information used for connection of the specific wireless communication link to the wireless terminal by the directional wireless communication and to send a second piece of security code generating information for generation of the security code to the wireless terminal by the directional wireless communication;

a second program code that causes the computer to encrypt one of the first and the second pieces of security code generating information with the other of the first and the second pieces of security code generating information as an encryption key and thereby generate the security code; and a non-transitory computer readable medium that stores the first program code and the second program code; and wherein said specific wireless communication is Bluetooth wireless communication and the directional wireless communication is infrared wireless communication, and the security code is a Personal Identification Number (PIN) code which is used for the connection authentication of the specific wireless communication link, and wherein the wireless station comprises multiple wireless communication units, when the wireless station receives the first piece of security code generating information, the wireless station selects one wireless communication unit among the multiple wireless communication units based on a preset first condition, as a first wireless communication module, the wireless station selects one piece of the wireless station ID information among multiple pieces of the wireless station ID information provided in advance as possible options for the wireless communication unit selected as the first wireless communication module based on a preset second condition, and sets the selected piece of the wireless station ID information in the first wireless communication module, the preset first condition includes at least one of selecting the wireless communication unit having the least communication load among the multiple wireless communication units and selecting one of the remaining wireless communication units other than the previous wireless communication unit used to thereby prevent consecutive selection of any identical wireless communication unit, and the preset second condition includes selecting the piece of the wireless station ID information that has not been used for a longest time period.

12. In a wireless terminal connected to a wireless station via a specific wireless communication link, a computer program product that causes a computer to perform connection authentication of the specific wireless communication link, the computer program product comprising:

a program code that, after transmission of a first piece of security code generating information for generation of a security code, which is used for connection authentication of the specific wireless communication link, to the wireless station by directional wireless communication utilizing a directional communication medium, in response to reception of both wireless station ID information used for connection of the specific wireless communication link and a second piece of security code generating information for generation of the security code, which are sent from the wireless station by the directional wireless communication, causes the computer to encrypt one of the first and the second pieces of security code generating information with the other of the first and the second pieces of security code generating information as an encryption key and thereby generate the security code; and a non-transitory computer readable medium that stores the program code; and wherein said specific wireless communication is Bluetooth wireless communication and the directional wireless communication is infrared wireless communication, and the security code is a Personal Identification Number (PIN) code which is used for the connection authentication of the specific wireless communication link, and wherein the wireless station comprises multiple wireless communication units, when the wireless station receives the first piece of security code generating information, the wireless station selects one wireless communication unit among the multiple wireless communication units based on a preset first condition, as a first wireless communication module, the wireless station selects one piece of the wireless station ID information among multiple pieces of the wireless station ID information provided in advance as possible options for the wireless communication unit selected as the first wireless communication module based on a preset second condition, and sets the selected piece of the wireless station ID information in the first wireless communication module, the preset first condition includes at least one of selecting the wireless communication unit having the least communication load among the multiple wireless communication units and selecting one of the remaining wireless communication units other than the previous wireless communication unit used to thereby prevent consecutive selection of any identical wireless communication unit, and the preset second condition includes selecting the piece of the wireless station ID information that has not been used for a longest time period.

* * * * *